United States Patent
Vernon et al.

(10) Patent No.: US 10,609,098 B1
(45) Date of Patent: *Mar. 31, 2020

(54) METHOD AND APPARATUS FOR PROVIDING EGALITARIAN CONTROL IN A MULTIMEDIA COLLABORATION SESSION

(71) Applicant: OPEN INVENTION NETWORK, LLC, Durham, NC (US)

(72) Inventors: Todd Vernon, Lafayette, CO (US); Dan Jones, Niwot, CO (US)

(73) Assignee: OPEN INVENTION NETWORK, LLC, Durham, NC (US)

( * ) Notice: Subject to any disclaimer, the term of this patent is extended or adjusted under 35 U.S.C. 154(b) by 456 days.

This patent is subject to a terminal disclaimer.

(21) Appl. No.: 14/458,731

(22) Filed: Aug. 13, 2014

Related U.S. Application Data

(63) Continuation of application No. 13/487,372, filed on Jun. 4, 2012, now Pat. No. 8,819,136, which is a continuation of application No. 11/768,145, filed on Jun. 25, 2007, now Pat. No. 8,204,935, which is a continuation of application No. 10/776,461, filed on Feb. 10, 2004, now Pat. No. 7,421,069.

(60) Provisional application No. 60/445,792, filed on Feb. 10, 2003, provisional application No. 60/445,830, filed on Feb. 10, 2003.

(51) Int. Cl.
  *G06F 15/16* (2006.01)
  *H04L 29/06* (2006.01)
  *H04N 7/15* (2006.01)

(52) U.S. Cl.
  CPC ......... *H04L 65/4046* (2013.01); *H04N 7/152* (2013.01)

(58) Field of Classification Search
  CPC ............................. H04M 3/566; H04M 3/567
  USPC ......................................................... 709/204
  See application file for complete search history.

(56) References Cited

U.S. PATENT DOCUMENTS

| | | | | |
|---|---|---|---|---|
| 5,220,657 A | * | 6/1993 | Bly ................... | G06F 17/30171 707/E17.007 |
| 6,014,135 A | * | 1/2000 | Fernandes ............. | G06F 3/0481 709/203 |
| 6,049,334 A | * | 4/2000 | Bates .................... | G06F 3/0481 715/745 |
| 6,144,991 A | * | 11/2000 | England ............ | G06F 17/30873 707/E17.111 |
| 6,336,134 B1 | * | 1/2002 | Varma ................. | H04L 12/1813 709/201 |
| 6,732,145 B1 | * | 5/2004 | Aravamudan .... | G06F 17/30873 707/E17.111 |
| 6,769,013 B2 | * | 7/2004 | Frees .................... | G06Q 10/10 707/999.01 |
| 7,043,529 B1 | * | 5/2006 | Simonoff ................ | H04L 67/02 709/204 |

(Continued)

FOREIGN PATENT DOCUMENTS

WO    WO0197151 A1 * 12/2001

*Primary Examiner* — Atta Khan

(57) ABSTRACT

A multimedia collaboration system that facilitates more efficient, free-flowing collaboration sessions. The role of the presenter can be exchanged among participants in a collaboration session. The multimedia collaboration system is configured so that control of a collaboration session can be exchanged freely between participants in the collaboration session. The multimedia collaboration system enables participants in the collaboration session to determine the pace and course of the session.

20 Claims, 26 Drawing Sheets

(56) References Cited

U.S. PATENT DOCUMENTS

| | | | |
|---|---|---|---|
| 7,072,940 B1 * | 7/2006 | Day | G06Q 10/10 |
| | | | 707/999.01 |
| 7,089,278 B1 * | 8/2006 | Churchill | G06Q 10/10 |
| | | | 709/203 |
| 7,162,528 B1 * | 1/2007 | Simonoff | G06Q 10/10 |
| | | | 709/205 |
| 7,404,001 B2 * | 7/2008 | Campbell | H04N 7/142 |
| | | | 348/E7.084 |
| 2002/0016861 A1 * | 2/2002 | Simonoff | H04L 29/06 |
| | | | 709/250 |
| 2002/0065912 A1 * | 5/2002 | Catchpole | G06F 17/30873 |
| | | | 709/224 |
| 2002/0085030 A1 * | 7/2002 | Ghani | G06Q 10/10 |
| | | | 715/751 |
| 2002/0087592 A1 * | 7/2002 | Ghani | G06Q 10/10 |
| | | | 715/239 |
| 2002/0122073 A1 * | 9/2002 | Abrams | G06F 17/30884 |
| | | | 715/838 |
| 2003/0149681 A1 * | 8/2003 | Frees | G06Q 10/10 |
| 2003/0182375 A1 * | 9/2003 | Zhu | G06F 17/24 |
| | | | 709/205 |
| 2004/0003351 A1 * | 1/2004 | Sommerer | G06F 17/30876 |
| | | | 715/251 |
| 2004/0034631 A1 * | 2/2004 | Julliard | G06F 17/30011 |
| 2007/0186002 A1 * | 8/2007 | Campbell | H04N 7/142 |
| | | | 709/231 |

* cited by examiner

METHOD AND APPARATUS FOR PROVIDING EGALITARIAN CONTROL IN A MULTIMEDIA COLLABORATION SESSION

RELATED APPLICATION INFORMATION

This application is a continuation application of U.S. application Ser. No. 13/487,372, filed Jun. 4, 2012, now issued U.S. Pat. No. 8,819,136, issued Aug. 26, 2014, which is a continuation of U.S. application Ser. No. 11/768,145, filed Jun. 25, 2007, now issued U.S. Pat. No. 8,204,935, issued on Jun. 19, 2012; which is a continuation application of U.S. application Ser. No. 10/776,461, filed Feb. 10, 2004, now issued U.S. Pat. No. 7,421,069, issued Sep. 2, 2008; which claims priority under 35 U.S.C. .sctn.119 to U.S. Provisional Patent Application No. 60/445,830, entitled "Method and Apparatus for Providing Egalitarian Control in a Multimedia Collaborative Session", filed on Feb. 10, 2003 and U.S. Provisional Patent Application No. 60/445,792, entitled "Method and Apparatus for Creating a Dynamic History of Presentation Materials in a Multimedia Collaboration Session", filed on Feb. 10, 2003, all of which are incorporated herein in their entirety as if set forth in full. This application is also related to U.S. Utility patent application Ser. No. 10/676,899, entitled "System and Architecture for a Multimedia Collaboration Session," filed Sep. 30, 2003 now issued U.S. Pat. No. 7,701,882 issued Apr. 20, 2010, which is also incorporated herein by reference in its entirety as if set forth in full.

FIELD OF THE INVENTION

This invention relates generally to the control of a multiparty conference session, and in particular, to the control of privileges and roles of participants in a multiparty conference session.

BACKGROUND

In the course of conducting activities involving multiple parties, a need often arises for people to meet to share information, exchange data or documents, discuss topics of mutual interest, or collaborate in preparing various documents or other work product. It may not be desirable, or possible, for all of the participants in a meeting to be in the same physical location at the same time, in which case meeting objectives may be achieved using various communication equipment and networks as tools for facilitating remote collaboration in a multimedia collaboration session, such as a multiparty conference session. It can be useful for such a session to include a variety of media types that include the participants' voices, video images, shared documents, text messages, drawings, computer screen images, etc.

Several systems exist for configuring various devices and networks into collaboration sessions. For example, multimedia collaboration systems require many components and resources such as server equipment, networking equipment, and media processing and distribution. Session participants may be distributed in a wide variety of locations, e.g., in the same building, multiple buildings, across a city, across a country, or internationally. Thus, the communication links between participants vary greatly in quality, bandwidth, and usage cost.

Conventional multimedia collaboration architectures can be divided into two basic architectures: central-server and peer-connected. In a central-server architecture, all participant clients communicate with a single server that performs control, routing, and media processing functions. The server is located at a point in the network topology that is often not optimal for a given session's participants. In addition, a central server architecture provides all media services from a single point in the network, preventing separation of media services and further preventing location of specific media services at optimal points in the network. In a peer-connected architecture, particip4.it clients communicate directly with one another.

There are several roles for participants in a collaboration session. One role can be that of a moderator or chair of the collaboration session. A moderator can, for example, initiate and/or control the collaboration session. Another role can be that of a presenter or speaker. A participant who is in a presenter role can have the ability to make presentations, e.g., in audio and/or video format, during the collaboration session. Another role can be that of a viewer. A participant who is in a viewing role can have the ability to review and/or hear the presentations made by whichever participant is presenting at that time. A collaboration session can include one or more participants, each of which can participate in any number of these roles.

Privileges or permissions can be established for various participants and/or roles for a collaboration session. Particular privileges or permissions can be repeated or reused for the participants and/or roles in successive collaboration sessions. The privileges can be referred to as rules as well. The privileges determine the activities and the manner in which participants can participate in a collaboration session.

As discussed above, typically one of the participants in a collaboration session is a moderator. The moderator can have different privileges than the other participants in the collaboration session. For example, the moderator can initiate and/or control the collaboration session. In some systems, the moderator can grant permission to other participants in the session to become presenters. In other systems, the moderator can grant co-moderator status to a participant.

As discussed above, the participant who is presenting data in the collaboration session is the presenter. The current presenter's control over the presentations in a collaboration session can be referred to as "floor control."

The handling of floor control in a collaboration session is usually based on some protocol. In other words, some communication between a participant and a moderator is required in order to achieve a change in floor control. In one example, protocol in the form of a "request to speak" inquiry is sent to the moderator or other coordinator of the collaboration session. Subsequently, a "request granted" or a "request denied" determination or response is sent from the moderator. In a conventional system, such protocol is often rigid and is unlike human behavior and interaction in meetings.

As a result, it is difficult in some conventional collaboration sessions to enable the same free flow of ideas and hand off of control among participants as that which normally occurs in a face-to-face or personal meeting. This is due in part to artificial control and coordination mechanisms imposed by the electronic collaboration that are not present in face-to-face meetings.

In conventional collaboration sessions, there is often only one participant who is designated as the presenter at a given time. The other participants in such collaboration session are viewers of the media presented by the presenter.

In some collaboration sessions, especially those sessions involving small workgroups, different participants may be scheduled to make presentations as part of the session. Thus, in some scenarios, every participant could be a presenter for some part of the session.

Conventional electronic meetings, such as collaboration sessions, often use pre-meeting preparation of presentations, e.g. slide decks, and generally use a single presenter at a given time during the meeting. Often the presentations must be "uploaded" to a central server prior to the start of the session. During a collaboration session with multiple presenters, handoff and coordination of floor control is often implemented using cumbersome mechanism that are not part of the normal flow of interactive meetings. Switching of floor control among presenters during a session typically requires a request, a negotiation and/or a designation by the moderator.

Some conventional systems do not enable participants to elect to view other media than that being presented by the current presenter. In other conventional systems, the role for each participant is initially assigned, but the sequence of presentations is usually not predetermined. Moreover, a large part of the productive output of such sessions is the ability to dynamically switch between presenters as the session occurs. Some control mechanisms typically require that certain roles are pre-assigned to participants granting them special authority. These roles are usually rigidly fixed prior to the start of the session and remain in place for the duration of the session.

In a face-to-face small meeting, content can be shared by multiple participants without any preparation. The control and flow of presentation sharing and speaking flow are regulated by social conventions and understandings. In conducting such a meeting electronically, any added flow control mechanism is both an added burden and hard-coded social construction that may or may not represent the desires of the participants. Etiquette, hierarchy, status, and respect are relevant components of such flow, yet these components require awareness of the other participants in the meeting.

SUMMARY OF THE INVENTION

A multimedia collaboration system that facilitates more efficient, free-flowing collaboration sessions.

In one aspect, the role of the presenter can be exchanged among participants in a collaboration session.

In another aspect, the multimedia collaboration system is configured so that control of a collaboration session can be exchanged freely between participants in the collaboration session.

In still another aspect, the multimedia collaboration system enables participants in the collaboration session to determine the pace and course of the session.

These and other features, aspects, and embodiments of the inventions are described below in the section entitled "Detailed Description of the Preferred Embodiments."

DETAILED DESCRIPTION OF THE INVENTION

Figure 1:
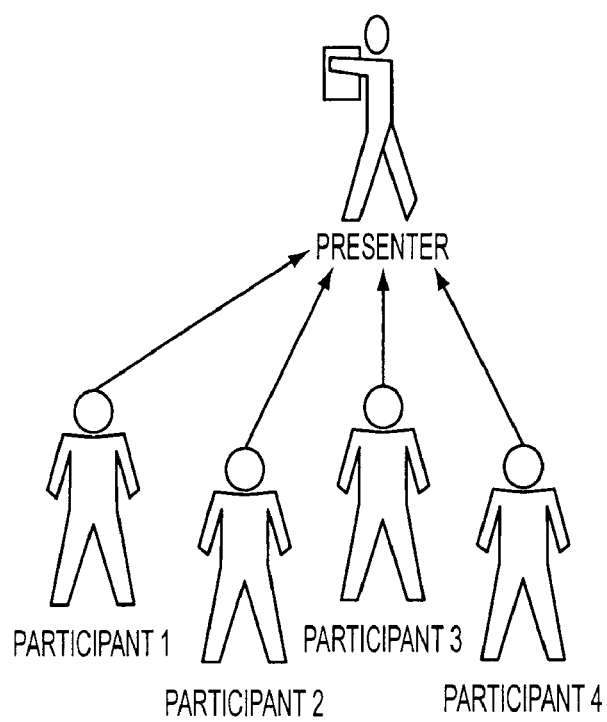
FIG. 1 is a diagram illustrating a conceptual view of participants in an exemplary collaboration session.

Several embodiments are discussed in detail below. While specific implementations are discussed in the context of a multiparty conference session, it should be understood that this is done for illustration purposes only. It will be apparent that the systems and methods described herein can be applied to any multimedia collaboration session or system.

The term "collaboration session" is meant to include any meeting in which several people or parties can communicate using data sent via connections established using shared electronic networks, i.e., intranet, Internet, or the like. Such a meeting can also be referred to by various terms, including a conference, a multimedia conference, a conference session, a multimedia collaboration session, and a multiparty conference session.

Multimedia collaboration sessions provide a convenient, low-cost solution for allowing individuals from various geographic locations to conduct a meeting by having discussions and sharing documents, such as drawings and slides, using common desktop devices such as personal computers and telephones. The distances between a local multimedia client device and a remote multimedia client device can range from instrastructure to distant remote locations. Participants in a collaboration session can share and collaborate in the preparation of documents stored on a particular user's device, such as a local computer, because the device can be the same device, as, or networked to, the device used in the collaboration session.

The term "participant" includes any person who is connected to a particular collaboration session and/or has the ability to communicate on a particular collaboration session or who receives a stream of data from a collaboration session. The data stream from a collaboration session can include audio data and/or video data as well as various types of media components such as presentation slides, video files, audio files, electronic documents, drawings, and instant messages.

Privileges for the various participants in a collaboration session configured in accordance with the systems and methods described herein can be defined. when a collaboration session is created. For example, a profile can be created for each participant for one or more collaboration sessions. In another embodiment, a profile can be created for each role for one or more collaboration sessions. In still another embodiment, a profile can be created for each participant and/or role for each type of meeting or collaboration session. Further, one or more appropriate existing profiles can be modified at any appropriate time. Each profile created or modified can include some input field or mechanism that enables the person setting up the collaboration session to determine which privileges each participant and/or role can have.

The mechanism by which privileges can be controlled and defined is referred herein to as a privilege control mechanism. This privilege control mechanism can be a software program or a control device. The privilege control mechanism can be configured to enable the person setting up the collaboration session to select the privileges for each role and/or participant. In one embodiment, an input such as a drop down window or text entry field can be provided to receive input from the coordinator of the collaboration session.

A collaboration session configured in accordance with the systems and methods, described herein can comprise an egalitarian approach to floor or presentation control. This egalitarian approach is applicable to any type of collaboration session.

In an egalitarian collaboration session, all participants can have equal privileges or levels of permissions. For example, the role of a presenter or speaker can be assumed at any time during the session by any participant in the session. Further, depending on the embodiment, media and presentation materials can be shared freely during the session by any participant. Rather than regulating the flow of the session by dictating specific roles and privileges for the participants, an egalitarian collaboration session enables the social conventions and etiquette of the participants in the session to establish the flow of the session, similar to that of a face-to-face meeting. In small workgroup meetings, interaction between participants is often more important and more productive than any rigid presentation format.

In one embodiment, an egalitarian collaboration system configured in accordance with the systems and methods described herein allows any participant in a collaboration session to make any type of media or other material available to the other session participants at any time. This arrangement enables the emulation of the free control of the flow of a face-to-face meeting. For example, while participants are free to interrupt each other and steal control of the floor, participants rarely do so because certain meeting conventions and etiquette apply.

Thus, all participants in an egalitarian collaborative session are treated equally by and are viewed as equals by the control system of the egalitarian collaboration session. There are no pre-assigned hierarchical roles such as a moderator or chair. The collaboration system does not require, enforce, or even acknowledge any predefined roles for the participants in a session.

It is to be understood that the controls do not prevent a participant in a session from either controlling the meeting or assuming the role of moderator. Communication is facilitated between participants and typical meeting behavior is enhanced. In one embodiment, a leader or chairperson of an egalitarian collaborative session can be designated in any particular manner by the participants.

In one embodiment, when multiple presentations are being made simultaneously, participants in an egalitarian collaboration session can choose which participant's presentation to view. This viewing decision may be changed by the participants freely at any time.

In another embodiment, an egalitarian collaboration system includes t central shared presentation area that can be controlled by one participant at any given time. This arrangement is different from an embodiment in which everyone presents, in that only one participant can present in the shared area at a given time.

The shared presentation area can be associated with a particular egalitarian collaboration session. This shared presentation area is analogous to a shared overhead projector in a face-to-face meeting. Any participant, at any time, can begin introducing material into this presentation area. In certain embodiments, only one participant can present at a time, but there is no control preventing anyone from presenting at any time. In one embodiment, the participant currently presenting is simply the most recent participant to choose to do so, and that participant can be interrupted at any time by any other participant.

In still another embodiment, any number of the participants in an egalitarian collaboration session can present media or a media stream simultaneously. Participants in such a session can choose to watch any number of those presentations. In an egalitarian collaboration session in which video streams are used, some of the participants may have a video camera directed at them. Participants in such a session can then, depending on the embodiment, choose to watch any participant and change this viewing choice as often as they wish.

In still another embodiment, a central server can be used to relay media streams between participants and duplicate input streams as required so that each participant receives a copy of the stream. The central server can be configured to coordinate the distribution of the streams to the relevant end point or end points for the participants.

Each participant in an egalitarian collaboration session can use client software that sends media streams and control commands to the server. When a participant chooses to begin presenting in a session, that participant can instruct her client, such as a desktop computer or other electronic device, to send a control command to an appropriate server in the collaboration system. The control command can include instructions requesting that the server begin receiving that participant's media or media scream and relaying the media or media stream to all other participants. Any participant can, depending on the embodiment, send such a control command at any time. Moreover, in certain embodiments, any participant can re-send such a control command as often, as needed. In one embodiment, the central server in the collaboration system implements the most recently received command. In the event conflicting commands are received simultaneously, the central server can be configured to choose arbitrarily among them.

FIG. 1 is a diagram illustrating a conceptual view of several participants in an exemplary collaboration session. While five participants are illustrated, any number of participants can be joined in the collaboration session.

In the example of FIG. 1, one of the participants is designated as the presenter for the session. The presenter 110 is represented in iconic form as holding a piece of material. The other participants 112, 114, 116 and 118 in the session cannot present, based on predefined rules for the session. In this embodiment, the participants 112, 114, 116 and 118 have the role of viewers of the material that is being presented.

Figure 2:
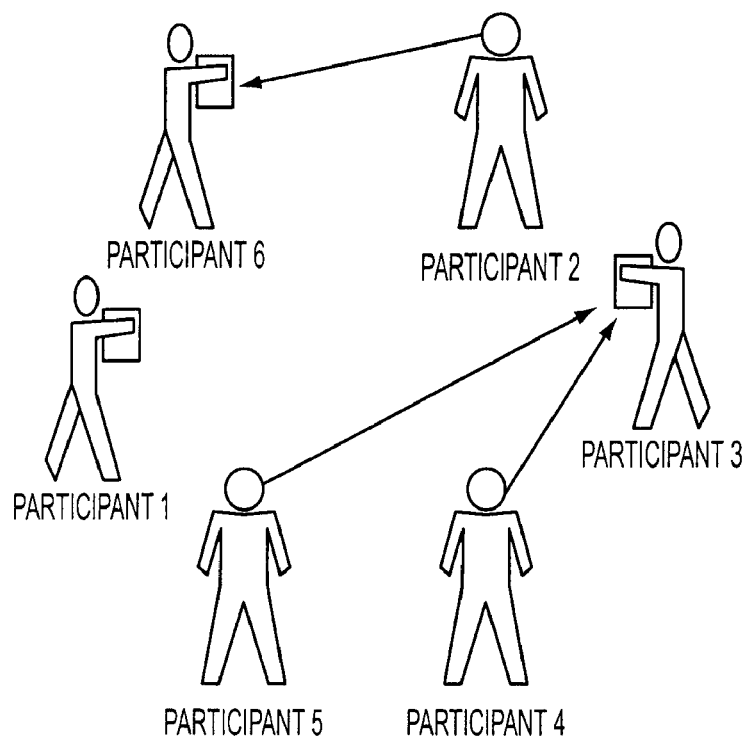
FIG. 2 is a diagram illustrating a conceptual view of participants in a collaboration session in accordance with one embodiment.

FIG. 2 is diagram illustrating a conceptual view of an embodiment of a collaborative session operating in accordance with the systems and methods described herein. While six participants are illustrated in this embodiment, any number of people can participate in the collaborative session.

As illustrated, several participants are represented as presenters for this session. In this example, there are three participants that are represented in iconic form as presenters at this particular point in time. As illustrated in FIG. 2, participants 210, 214 and 220 are considered as presenters at this time. In this embodiment, the collaboration session is, initially established without particular floor control rules or any rules defining the privileges or roles for the participants in the collaboration session. As a result, any of the participants in this session can function as a presenter during the session.

As discussed above, the setup of the controls of the collaboration system 200 can allow participants to select which presenter to view. Thus, as illustrated in FIG. 2, participants 216 and 218 are viewing the presentation of participant 214, while participant 212 is viewing the presentation of participant 220. Each participant can select a particular presentation to view.

There can be several types of egalitarian collaboration session models. One type is an egalitarian viewing model in which participants select their view of the session. Conventional collaboration sessions often have a single video feed or data stream available to participants. But, in the egalitarian viewing model, participants can select different views and can change their views during the session.

Another type is an egalitarian sharing model in which participants can share presentation materials with the other participants at any time during the session. Another type is an egalitarian speaking model in which participants can speak with the other participants at any time during the session.

It can be appreciated that the components of a collaboration system configured to provide egalitarian collaboration sessions can be co-located on a single system or device, such as a server, or located on different devices.

In one embodiment, full access to all aspects of an egalitarian collaboration session is the default for all participants in the session. Thus, there is a lack of control and no rigid rules or roles are defined. In an alternative embodiment, participants can have the option of muting everyone else while they are speaking.

In one embodiment, if all participants in a collaboration session are entitled to or have full privileges, any participants that join the session have the ability to participate freely even though they were identified or present prior to the commencement of the session. Each participant has equal privileges and can make presentations, and thus all participants are on equal footing.

In another embodiment, when an egalitarian collaboration session is created, the levels of privileges are set for participants and/or roles. Nevertheless, a moderator or coordinator for the collaboration session can have the ability to change any of the privileges. In one embodiment, a backend server system can be used to establish an egalitarian collaboration session and enable this type of privilege setting arrangement. Various media types can be required for a particular egalitarian collaboration session. Sometimes the media components can change during a session. Other times, a need can arise during an ongoing session to add a new media component. In one embodiment, the new media component to be added can involve a separate network.

Figure 3:
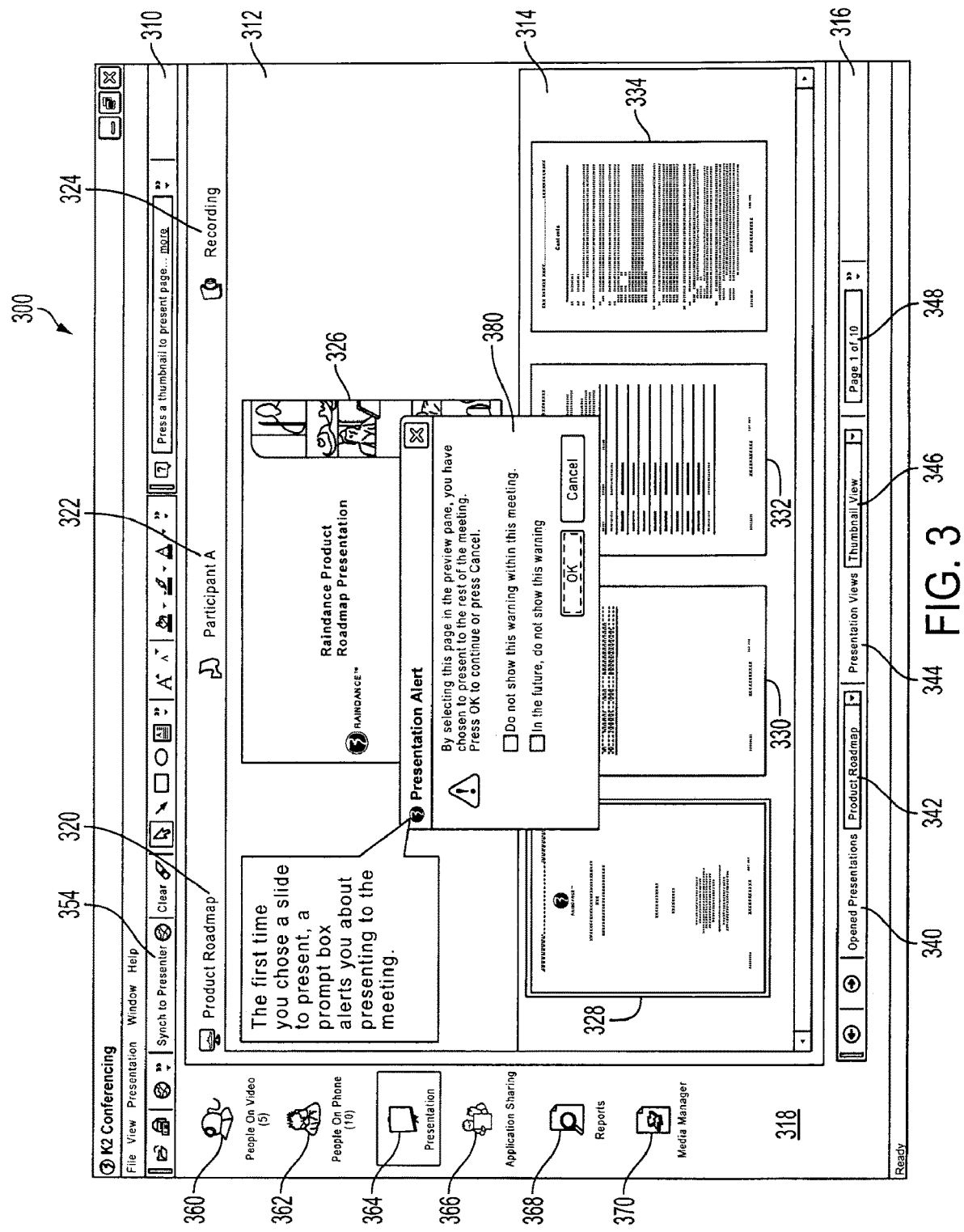
FIG. 3 is an exemplary screen shot illustrating a user interface according to one embodiment.
Figure 4:
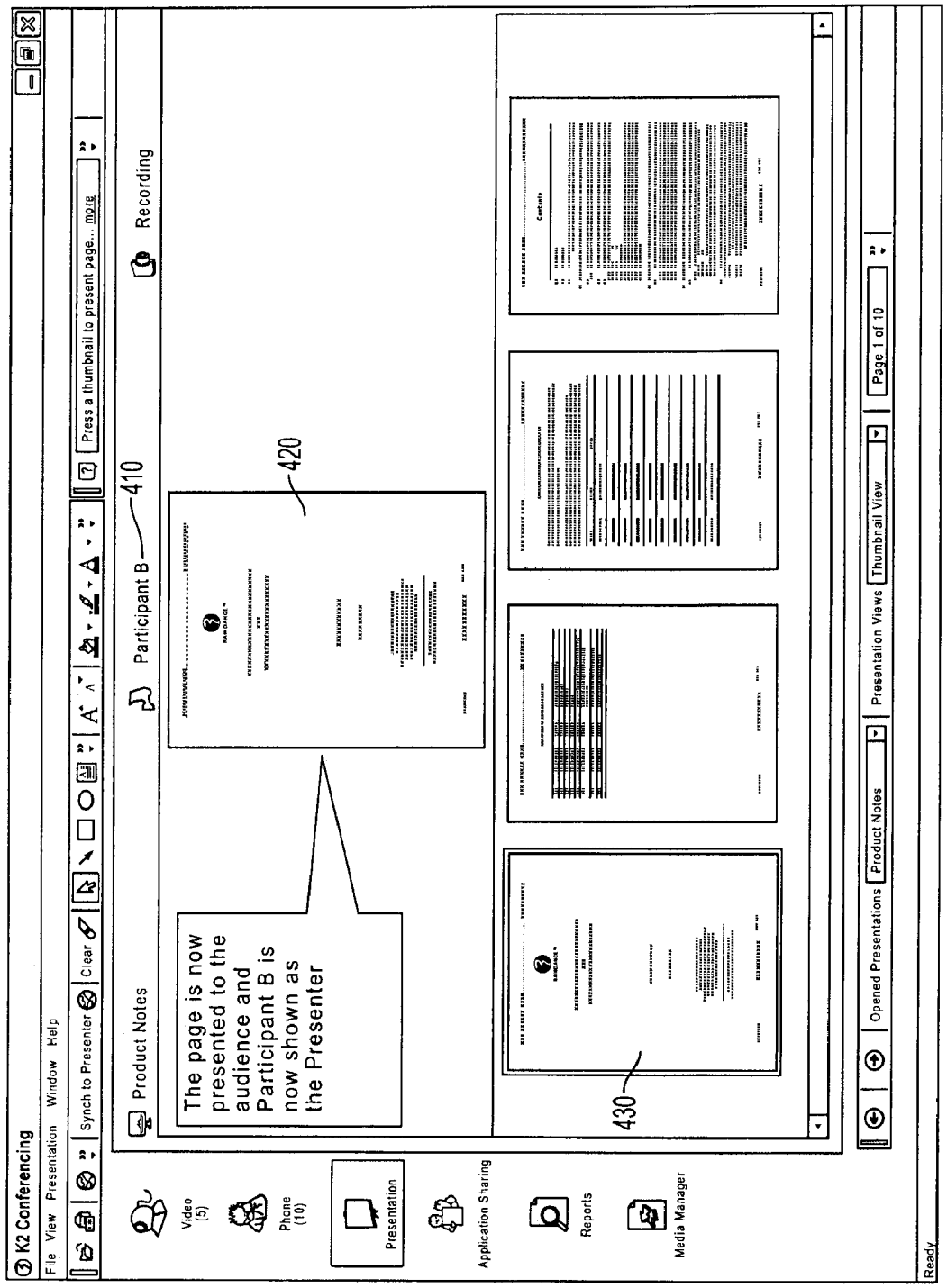
FIG. 4 is an exemplary screen shot illustrating a user interface according to another embodiment.

Embodiments of screen shots illustrating a user interface configured according to the present invention are illustrated in FIGS. 3 and 4. These screen shots illustrate the process by which different participants can present during a collaboration session. In alternative embodiments, any number of participants can present and any type of material can be shared.

Referring to FIG. 3, an embodiment of a user interface 300 is illustrated. In this embodiment, the interface 300 includes an identification section 310, a current presentation section 312, a live history section 314, and a control section 316. In various embodiments, the user interface can include any combination of these sections. Alternatively, the user interface can include these sections in any arrangement or configuration.

The identification section 310 can include the title 320 of the presentation. In this embodiment, the title 320 of the presentation is "Product Roadmap." The title 320 in the identification section 310 can change based on the particular presentation in the session.

The identification section 310 can also include the identity of the presenting participant. In this embodiment, the presenter's identity 322 is the name of the participant who is presenting the currently displayed material, i.e., Participant A. The identification section 310 can also include an indicator 324 that indicates that the current session is being recorded.

The current presentation section 312 can include a display of the presentation material that is being presented at that particular point in time. In this example, the current presentation section 312 includes a representation of a slide 326. It can be appreciated that any type and format of presentation material can be displayed in the current presentation section 312 of the user interface 300. Depending on the embodiment, each participant in the session views the current presentation section 312.

The live history section 314 of the user interface 300 can include information corresponding to materials that have been presented in the collaboration session. In one embodiment, the live history section 314 of the user interface 300 includes a series of iconic representations. The information, such as the iconic representations, can continuously scroll, e.g., toward the left of the screen. Depending on the embodiment, the movement of the information can be controlled by each individual viewer, for example, by a scroll bar. In the example of FIG. 3, the first iconic representation 328 is the cover sheet of the presentation element that has been presented, which in this case is a document. The second iconic representation 330 is the next element that was presented after the first element. A third iconic representation 332 is the next element that was presented after the second element. A fourth iconic representation 334 is the next element that was presented after the third element.

It can be appreciated that any number of presentation elements can be located in the live history section 314. Similarly, any type of presentation materials can be included as well. The live history section 314 allows each participant in the collaboration session to view all of previously presented slides and other materials.

Further, it should be appreciated that while the elements displayed in live history section 314 are displayed as iconic representations, other representations are possible. For example, full representations of each element can be displayed, depending on the embodiment. Additionally, in many embodiments, the size of live history section 314 can be adjusted, e.g., as windows are normally adjusted in a windows type of operating system. In such embodiments, elements may appear as iconic representations when live history section 314 is small, but expand to full representations as live history section 314 is expanded, or increased. Alternative embodiments for a user interface that can be used in conjunction with the systems and methods described herein, such as those illustrated in FIGS. 3 and 4, are discussed in detail below in relation to FIGS. 6 through 25.

In the user interface 300, the live history section 314 can include a scroll bar that can be adjusted by the viewer to view a particular subset of those iconic representations associated with the presented materials. In one embodiment, the background color can change for presentation elements to show which of the elements is currently being viewed.

In one embodiment, each iconic representation in the live history section 314 is associated with a link, such as a hypertext link, that corresponds to or otherwise links the viewer to the relevant material stored on the viewer's client device. For example, when a slide is shown in the current presentation section 312, that slide is broadcast or distributed to and stored on each participant's client device, which could be a personal computer. The conferencing software on the client device can be configured such that it is aware of the location of the stored slides or presentation materials. A link within the live history section 314 can thus be created that allows a viewer to go back and view those materials that have been previously presented.

It will be understood that, depending on the embodiment, the term "storing" as used in the previous paragraph in describing how media are handled as a participant's client device can mean that the data is simply maintained in application memory and not necessarily stored physically on the participant's client device. Alternatively, of course, in certain embodiments the media can be physically stored, but it is not necessary. The fact that physical storage is not necessarily required can be important because the media can comprise sensitive or confidential information that may not be appropriate for storage on every participant's client device. Thus, required security can be achieved by preventing physical storage at the client device's in such instances.

The control section 316 can include several different control features that enable the viewer to experience different parts of the collaboration session. In the illustrated embodiment, each of the control features in the control section 316 includes a drop down window in which several options are presented to the viewer. In the illustrated embodiment, the first control feature is the opened presentation feature 340. This feature 340 has a drop down window 342 that can be used by the viewer to select the particular presentation that is opened and viewed in that participant's user interface.

The control section 316 can also include a second control feature that is a presentation views control feature 344. This feature 344 can have a drop down window 346 that can be used by the viewer to select the particular format in which the presented material is viewed. In this example, the drop down window 346 is set at thumbnail views, which means that the iconic representations in the live history section 314 are in a thumbnail view format.

In alternative embodiments, the iconic representations in the live history section 314 can be shown in any number of views. For example, the iconic representations can be shown with titles only, a details view with information about each representation, small icons, large icons, etc.

In one embodiment, the user interface 300 can include several additional controls that allow a viewer to control his or her view of the session. In the menu bar illustrated in FIG. 3, the user interface 300 includes a sync to presenter button 354. This button 354 can be configured to enable the viewer to jump to the currently presented slide or presentation material if the viewer has fallen behind on the presentation. For example, the viewer can privately look at other slides or materials and may want to get current on the materials presented.

In certain embodiments, there is only included a single, central presentation section 312. In such embodiments, there is often no need to include sync to presenter functionality, since such embodiments will include the single, central presentation area that updates for all participants, whenever something is presented by any other participant; however, in embodiments that include separate presentation areas.

For example, in certain embodiments, participants can be allowed to create new presentation spaces within a collaborative communication session. In such embodiments a single, central presentation section 312 can still be included. But in addition, each participant can be allowed to create their own presentation space, or spaces. A participant that chose to do so can then, for example, present to any of the available presentation spaces. Then, as described above, any participant can decide which presentation space to view at any time. In such embodiments, it can be preferable to include a sync to presenter functionality, as described, as a mechanism to automatically take participant to the central presentation section 312, or to the presentation sections that last had something shared into it.

Thus, in such embodiments, a mechanism for selected which of multiple presentation sections can also be included. For example, in the user interfaced illustrated by the screen shot of FIG. 3, current presentation section 312 can be configured to show something different depending on what feature a participant has selected. If video has been selected, then current presentation section 312 can, e.g., show the participant and one other person's. If document viewing has been selected, then central presentation area can be configured to show the current slide, or document being presented. If application sharing has been selected, then application sharing is displayed, assuming that another participant was sharing something. Thus, if one participant presented a slide, and another participant had previously selected some other feature, the other participant will not necessarily see the presented slide. Rather, the other participant would see the feature that the participant had selected.

In such situations, a sync to presenter functionality can be included to automatically take the other participant to the feature that last had something presented into it. Accordingly, when a participant is using features on their own, e.g., no necessarily as part of the flow of the collaborative communication session, then a sync to presenter functionality can allow the participant to synch up with the current feature.

Again, however, such functionality is not necessarily required where there is a single, central presentation section 312. Such a central presentation section can be referred to as a public workspace. The public workspace can be configured such that it is always visible for every participant and such that everything that is presented into the collaborative communication session appears in the public workspace. Accordingly, all participants are effectively always synced to the current presentation because everything being presented appears in the public workspace for all participants.

Such embodiments can also include a private workspace that is unique for each participant and into which is displayed the features or functions that a particular participant has selected. For example, if a participant did want to review previous slides in a slide show, a live history link can be included that when selected places the previous slides into the private workspace for that participant. The public workspace can then still show the latest thing that was presented.

In certain embodiments, the live history function will only return the previous slides, or other items being presented, from the point a participant joined the collaborative communication session. This is because slides, for example, can be quite large and take an excessive amount of time, and bandwidth, to download.

The user interface 300 can also include a people on video icon 360. In this example, the video icon 360 has the number 5 next to it. The number 5 represents the number of participants in the session for which video data or a video stream is available. In other words, each participant that has a video camera and who is connected to the collaboration session in such a manner that allows video from the camera to be distributed to all participants, that participant would be counted as a video option for other participants.

Those participants in the session that have the capability to receive such video data can click on the video icon 360 and video feed options are presented. In one embodiment, a list of all of the participants for whom a video stream is available is displayed for the user in an option format. Each viewer can then select the particular participant for whom a video stream is desired. This selection can be changed at any time during the session.

The user interface can also include a separate area for displaying real-time video streams from participants in the collaboration session who have video cameras. This can be illustrated by video presentation area 2302 in FIG. 23, which is described in more detail below. In one alternative embodiment, for example, a list of all participants in the collaboration session can be displayed in the user interface. Each viewer can then select the particular participant from whom a video stream is desired. This selection can, depending on the embodiment, be changed at any time during the session. In one embodiment, a participant can only view one video at a time; however, other embodiments might allow a participant to select multiple participants' video streams, in which case the user interface can include video display windows for each video selected, and display all of the video streams simultaneously.

The user interface 300 also includes a phone icon 362. The phone icon 362 has the number 10 next to it in FIG. 3. The number 10 represents the number of participants that are connected to the collaboration session on an audio basis. The number of participants connected to a particular session on an audio basis can be different than the number on a video basis.

The user interface 300 can also include an icon 364 associated with the presentation. This icon 364 is highlighted in the illustrated example in FIG. 3 and can be associated with the particular presentation. When the icon 364 is highlighted, it means that the particular presentation is now available to the viewer.

The user interface 300 can also include an application sharing icon 366. Depending on the embodiment, the viewer can click on the application sharing icon 366 when the viewer wants to share an application or document on that viewer's desktop. The user interface 300 can also include a report icon 368 and a media manager icon 370. If the viewer plans to share media in a particular format, the viewer can click on the media manager 370 and prepare the materials in the particular format desired.

When a participant wants to share a presentation element that has already been presented, the participant can freely do so because there are no rules or privilege limitations preventing the same. In this example, participant B, whose user interface 300 is shown in FIG. 3, can select iconic representation 328 to present it again to the other participants. When participant B selects representation 328 with a mouse or other mechanism, a border is highlighted around the perimeter of representation 328. In an alternative embodiment, some other visual indicator, such as a color change or highlighting, is provided proximate to the selected representation 32d.

When participant B selects the representation 328, a pop-up window 380 can be configured to appear, requesting that participant B confirm the desired actions. In this embodiment, the pop-up window 380 alerts participant B to the fact that the element that participant B just clicked on will be published to all of the participants. If participant B selects the "OK" button, then the user interface can change to that shown in FIG. 4.

Referring to FIG. 4, an embodiment of an alternate user interface 400 is illustrated. In this embodiment, user interface 400 shows that the currently displayed element 420 has changed to the element that participant B selected in the public workspace or live history area in the user interface 300 in FIG. 3. The presenter identifier 410 in participant B's user interface 400 has been updated to reflect that participant B is the presenter of the currently displayed element in the current presentation section. Element 420 is the same as element 430 in the preview area of the user interface 400.

Figure 5:
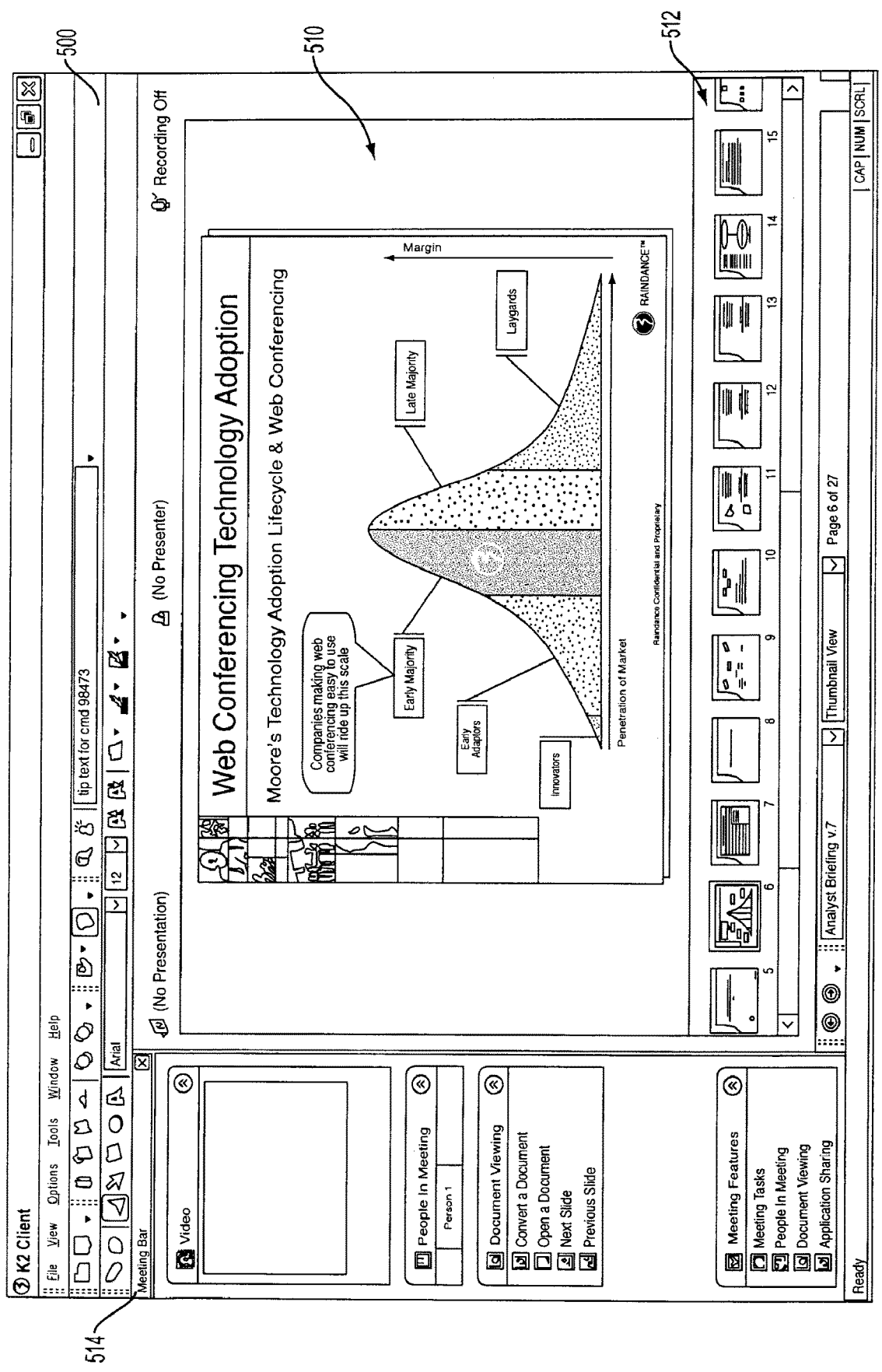
FIG. 5 is an exemplary screen shot illustrating a user interface according to still another embodiment.

An alternative embodiment of a user interface according to the present invention is illustrated in FIG. 5. In this embodiment, user interface 500 includes several features or components that are similar to those discussed with respect to FIGS. 3 and 4 above. It will be appreciated that any user interface can have any combination or arrangement of features and/or components that are described herein.

User interface 500 includes a presentation section 510 and a public workspace or live history section 512. User interface 500 also includes a control section 514 that has a video feed section, a "people in meeting" section, a document control section, and a meeting features section. In alternative embodiments, any arrangement of these sections can be included in user interface 500. The various options provided for each of the sections can change for particular user interfaces.

As mentioned above, alternative embodiments of user interfaces that can be configured to provide the functions and features described herein are illustrated in FIGS. 6 through 25. In particular, alternative implementations of the live history feature described above are illustrated in the following figures. The live history feature can be an important feature because, while some conventional collaboration systems allow for the materials that are presented to be recorded for later play back, often the recording is not available until after the session has ended. Thus, a participant is unable to go back and review what has been presented previously.

In a collaborative communication system configured in accordance with the systems and methods described herein, all elements that have been presented during a collaboration session can be kept track of and displayed to each participant. These elements can, for example, be displayed in a single list-like format. Such a list can be referred to as a "live history" or dynamic index that is available to all participants in the session as additional elements are being presented. As a result, a dynamic history of all of the presented elements can be continuously, generated during a collaboration session. In one implementation, the system makes available to all of the participants all of the elements that have been presented in the session, regardless of the number of presenters. As discussed above, and further below, the presented elements can be made available in a live history window in the user interface of participants in a collaboration session.

In one embodiment, participants in a collaboration session can privately review any slide or other materials that has been presented without disturbing the flow of the ongoing session. Any participant can, for example, select a previously displayed slide or other materials for sharing again with all participants in the session. A participant joining a collaboration session after the start can also easily review materials that have been presented before his or her arrival.

Certain embodiments can be configured to also provide each presenter with the capability to set levels of access or rights to the materials that are presented. In one embodiment, for example, a presenter can set attributes for particular materials to prevent or disable viewers from saving a copy of the presented materials. For example, if an attribute allowing the saving of a file is set, a viewer can save a copy of the file. Alternatively, the particular attributes can be set so that a viewer can only view the presented material during the session. This arrangement resembles a face-to-face meeting behavior where sometimes slides are presented only on a projection screen and sometimes copies of the presented materials are available for participants to take away from the session for later reference.

Figure 6:
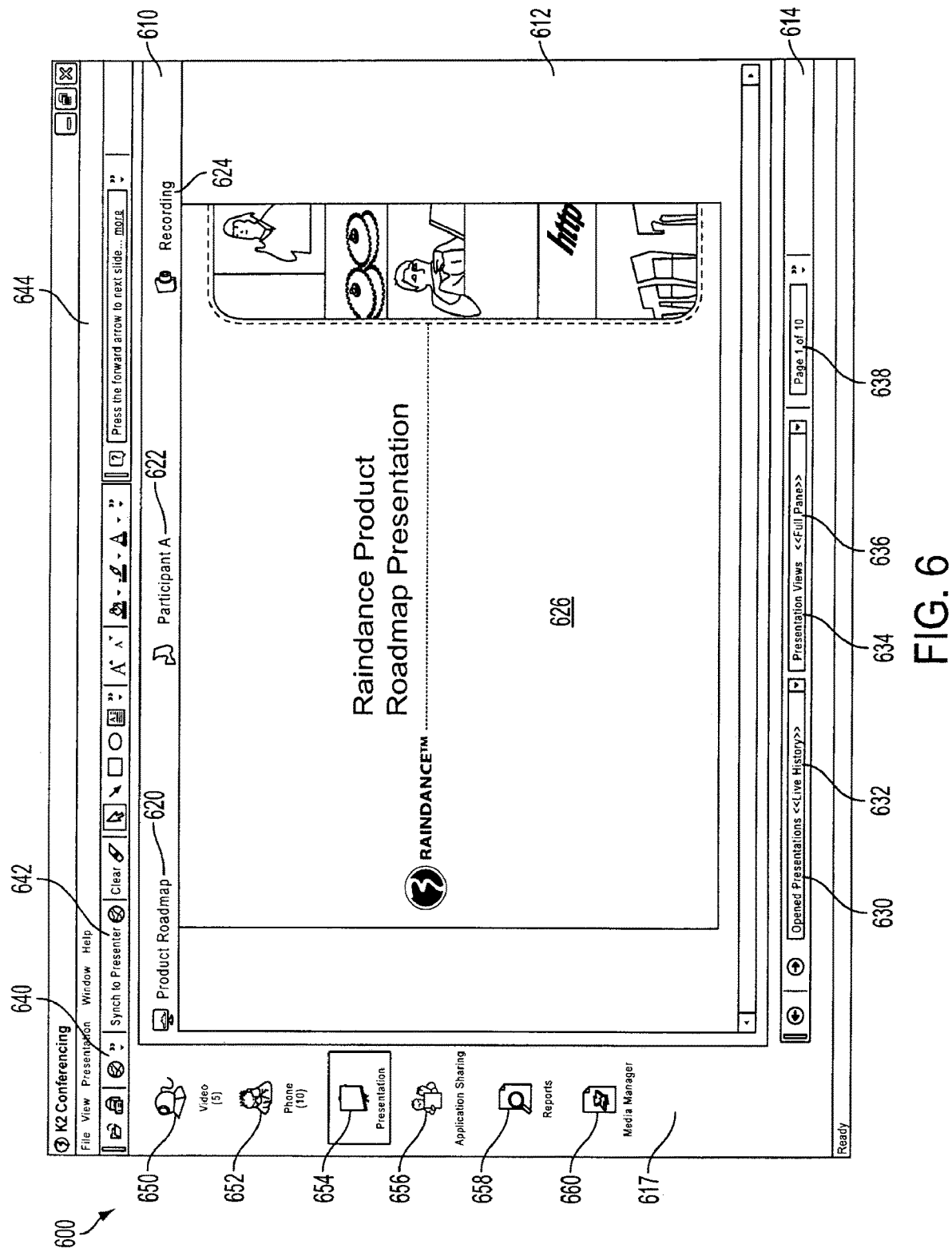
FIG. 6 is an exemplary screen shot illustrating a user interface according to still another embodiment.

FIG. 6 is a screen shot illustrating an alternative embodiment of a user interface 600 configured to provide the features and functions described herein. Like those described above and below, user interface 600 is exemplary of a user interface that a participant in a collaboration session operating according to the systems and methods described can view during the collaboration session. In various embodiments, the user interfaces described can include any combination of features and the features can be arranged in any configuration. The features are intended to be exemplary of features that could be included in a user interface.

In embodiment of FIG. 6, user interface 600 includes an identification section 610, a current presentation section 612, a control section 614 and an options section 617. As noted above, the locations of these sections can vary in alternative embodiments.

Identification section 610 includes a title 620 of the current presentation. In the embodiment of FIG. 6, title 620 of the presentation is "Product Roadmap." Title 620 in the identification section 610 can change based on the particular presentation. Identification section 610 can also include the identity of the presenting participant. In this embodiment, the presenter's identity 622 is the name of the participant who is presenting the currently displayed material. The identification section 610 can also include an indicator 624 that indicates that the current session is being recorded.

Current presentation section 612 can include a display of the presentation material that is being presented at that particular point in time. In this example, current presentation section 612 includes a representation of a slide 626. It can be appreciated that any type and format of presentation material can be displayed in current presentation section 612 of user interface 600. As described above, in mans embodiments, each participant in the session views current presentation section 612.

In an alternative embodiment, control section 614 can include several different control features that enable the viewer to experience different parts of the collaboration session. For example, each of the control features in control section 614 can include a drop down window in which several options are presented to the viewer. Control section 614 can be referred to alternatively as a navigation toolbar.

In the embodiment illustrated in FIG. 6, the first control feature is an, opened presentation feature 630. Feature 630 has an associated drop down window 632 that can be used by the viewer to select the particular presentation that is opened and viewed in that participant's user interface.

In an alternative embodiment, control section 614 can include a second control feature that is a presentation views control feature 634. Feature 634 has a drop down window 636 that can be used by the viewer to select the particular format in which the presented material is viewed. In this example, drop down window 636 is set at full pane, which means that currently presented element 626 is displayed in its full pane format.

In an alternative embodiment, control section 614 can also include a text box 638, which may be colored, that informs the participant viewing user interface 600 where the presentation is overall. For example, text box 638 indicates that the presentation is currently on page 1 out of 10.

User interface 600 can also include several additional controls that allow a viewer to control his or her view of the session. In the menu bar illustrated in FIG. 6, a record button 640 is provided to allow the viewer to record any audio and/or video material that is associated with a particular collaboration session. In one embodiment, the viewers can record such information if they have such rights or privileges to do so. Further, user interface 600 can also include a synch to presenter button 642 as described above.

User interface 600 can also include a tips or help box 644, which can represent an area that is used to provide participants with tips and suggestions on whatever action they are trying to perform. In one embodiment, tips box 644 is a tool bar that can be moved to different locations on the user interface 600. In another embodiment, tips box 644 can be removed from user interface 600. In the illustrated example, tips box 644 includes the tip "Press the forward arrow to next slide."

In an alternative embodiment, the options section 617 of user interface 600 includes a video icon 650. In this example, video icon 650 has the number 5 next to it. The number 5 represents the number of participants in the session for which video data or a video stream is available. In other words, each participant who has a video camera and is connected to the collaboration session in such a manner that allows video data from the camera to be distributed to all participants, that participant would be counted as a video option for other participants. In certain embodiments, those participants in the session that have the capability to receive such video data can click on a video icon 650 and video feed options are presented. In one embodiment, a list of all of the participants for whom a video stream is available is displayed for the viewer in an option format. Each viewer can then select the particular participant for whom a video stream is desired. This selection can be changed at any time during the session.

Options section 617 can also include a phone icon 652. Phone icon 652 has the number 10 next to it. The number 10 represents the number of participants that are connected to the collaboration session on an audio basis. The number of participants connected to a particular session on an audio basis may be different than the number on a video basis. Options section 617 can also include an icon 654 associated with the presentation. When icon 654 is highlighted, as illustrated in FIG. 6, it means that the particular presentation is now being shown to the participants. Options section 617 can also include an application sharing icon 656. The viewer can, for example, click on the application sharing icon 656 when the viewer wants to share an application or document on that viewer's desktop. Options section 617 also includes a report icon 658 and a media manager icon 660. If the viewer plans to share media in a particular format, the viewer can click on media manager 660 and prepare the materials in the particular format desired.

It should be noted that depending on the embodiment, many different media types can be presented and shared among participants, For example, slide presentations, word processing documents, Microsoft spreadsheets and other forms of electronic documents can be shared by the participants.

Figure 7:
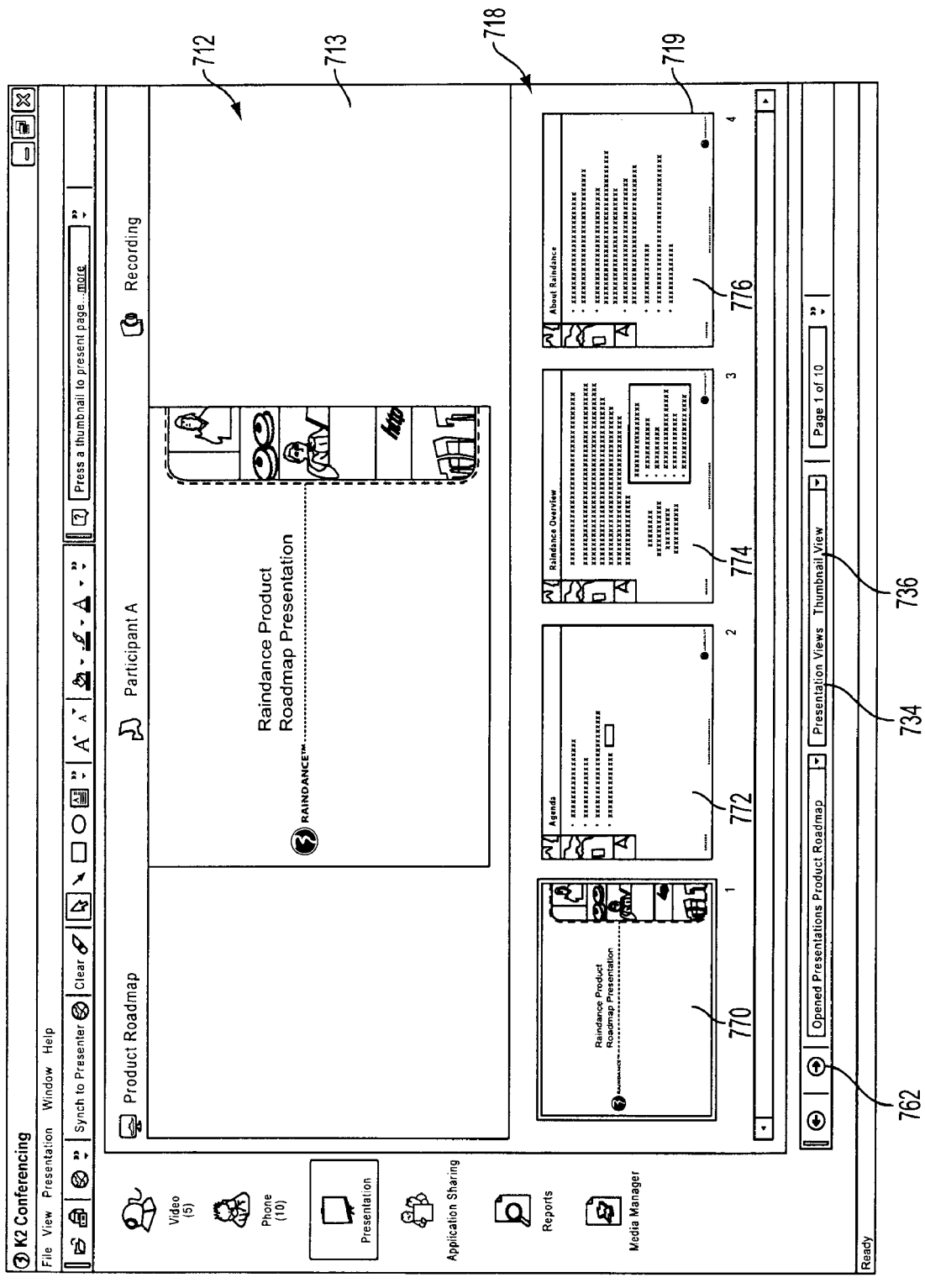
FIG. 7 is an exemplary screen shot illustrating a user interface according to still another embodiment.

An alternative embodiment of a user interface 700 configured according to the systems and methods described herein is illustrated in FIG. 7. In this embodiment, many of the features of user interface 700 are the same as those of user interface 600. Accordingly, only the different features of user interface 700 are discussed in detail.

As illustrated in FIG. 7, user interface 700 includes a current presentation section 712. Current presentation section 712 can include a background 713 that can be used to inform participants in the session as to what material is being shown to all participants. In one example, background 713 can be a particular color, such as gold, to indicate that that portion of user interface 700 is considered "live." If current presentation section 712 is indicated as being live, then any material within section 712 is being viewed by all participants in the session. In an alternative embodiment, changes in color are not included and it is the location of the panes that indicates which area is live and which area is private.

User interface 700 can include a live history section 718 that can also be referred to alternatively as a preview section or private workspace. Live history section 718 can includes information corresponding to materials that have been presented in a collaboration session. In one embodiment, live history section 718 can include a series of iconic representations. The information, such as the iconic representations, can be configured such that it continuously scrolls, e.g., toward the left of user interface 700 as additional materials are presented. In certain embodiments, the movement of the information can be controlled by each individual viewer, for example, by a scroll bar. In alternative embodiments, the iconic representations can move in any direction, e.g., vertically, or may otherwise change according to known presentation methods as controlled by either the participant and/or the conferencing system.

In this embodiment, live history section 718 includes a background 71 that can be used to inform the participant viewing user interface 700 about particular material. In one example embodiment, background 719 can be a particular color, such as white, to indicate that that portion of user interface 700 is considered "preview." In another example embodiment, if live history section 718 is indicated as being preview, then any material within section 718 is viewed only by the presenter. As discussed above, the location of the areas or panes can be used to inform the participant which area is live and which is private. For example, the live area can be located above the private area in the user interface.

In an alternative embodiment, participants in a session have the option of viewing the history of presentation materials. In this scenario, each participant who selected to view the presentation history would see live history section 718 in user interface 700. This type of view can be referred to as a live history view in which each participant in the session can view all of the materials that have been presented.

Live history section 718 can also include a series of iconic representations that correspond to materials to be presented. When a session begins, this arrangement of iconic representations can be what the presenter views in his or her user interface 700. In the illustrated embodiment, iconic representations 270, 272, 274 and 276 are the first four slides of the presentation that the presenter is going to give. The manner in which presentations are made is described in greater detail below.

Live history section 718 can also include a series of iconic representations that correspond to materials that have been presented. In the illustrated embodiment, first iconic representation 770 is the cover sheet of the presentation that is being shown in current presentation section 712. In this case, representation 770 is a slide. Second iconic representation 772 is the next slide that was presented after the first slide. Representation 772 is also in the form of a slide. A third iconic representation 774 is shown in live history section 718. Representation 774 was presented after the second slide. Live history section 714 also includes a fourth iconic representation 776, similar to the other representations.

It can be appreciated that any number of presentation elements can be located in live history section 718. Similarly, any type of presentation materials can be included as well. Live history section 718 can be configured to allow each participant in the collaboration session to view all of previously presented slides and other materials.

Within user interface 700, live history section 718 includes a scroll bar that can be adjusted by the viewer to view a particular subset of those iconic representations associates with the presented materials. In one embodiment, the background color can change for presentation elements to show which of the elements is currently being viewed.

In one embodiment, each iconic representation in live history section 718 is associated with a link, such as a hypertext link, that corresponds to or otherwise links the viewer to the relevant material stored on the viewer's client device. For example, when a slide is shown in current presentation section 712, that slide is broadcast or distributed to and stored on each participant's client device, which could be a personal computer. The conferencing software on the client device is aware of the location of the stored slides or presentation materials. A link can then be created that allows a viewer to go back and view those materials that have been previously presented. Similarly, when a presentation is loaded on the presenter's device, the conferencing software on that participant's device can be aware of the location of the stored slides or presentation materials. Thus, a link can also then be created that allows the presenter to go back and view those materials that have been previously presented. Links can also used to facilitate the presentation of the materials.

User interface 700 can also include a presentation views control feature 734, which as illustrated, can be changed to thumbnail view 736. The changing of the presentation views control feature is discussed in more detail with respect to FIG. 9.

User interface 700 can also include a loading mechanism 762, such as a button, that can be used by a participant to preload or pull any presentation opened during or prior to the session. By selecting loading mechanism 762, preview section, or live history section 218 can be populated with the presentation previews. However, live area or current presentation section 712 can be configured such that it is not changed until a new page is selected.

Figure 8:
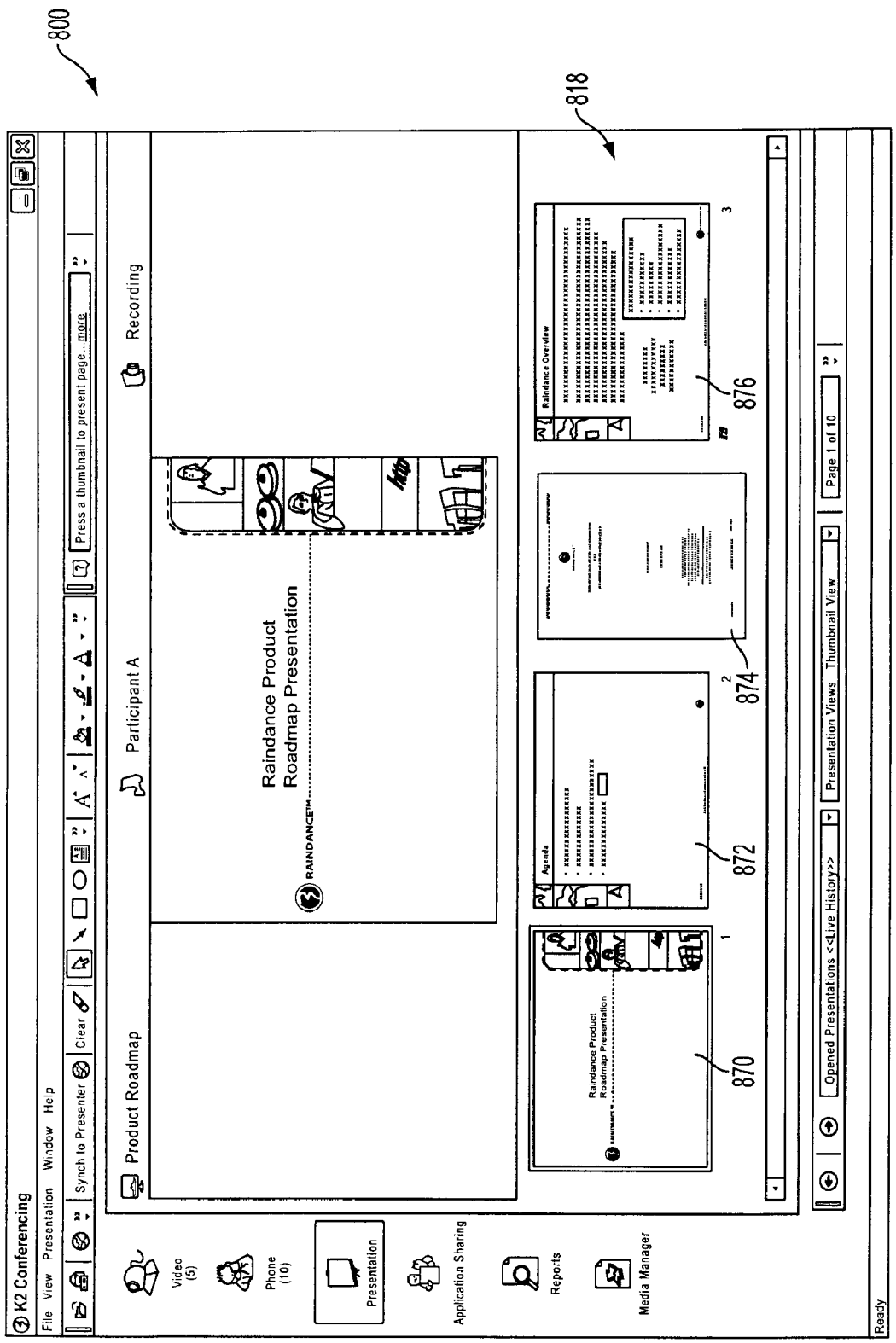
FIG. 8 is an exemplary screen shot illustrating a user interface according to still another embodiment.

An alternative embodiment of a user interface 800 configured in accordance with the systems and methods described herein is illustrated in FIG. 8. In this embodiment, many of the features of user interface 800 are the same as those of user interfaces 600 and 700. Accordingly, only the different features of user interface 800 are discussed in detail.

As illustrated in FIG. 8, user interface 800 includes a live history section 818. Live history section 818 can include several iconic representations 870, 872, 874 and 876. As illustrated, representation 874 is in a different format than the other representations. In this embodiment, are presentations can be different based on the original source of the presented material, such as a slide, a document, a drawing, etc. In alternative embodiments, any combination of different types of presentation materials can be presented.

Figure 9:
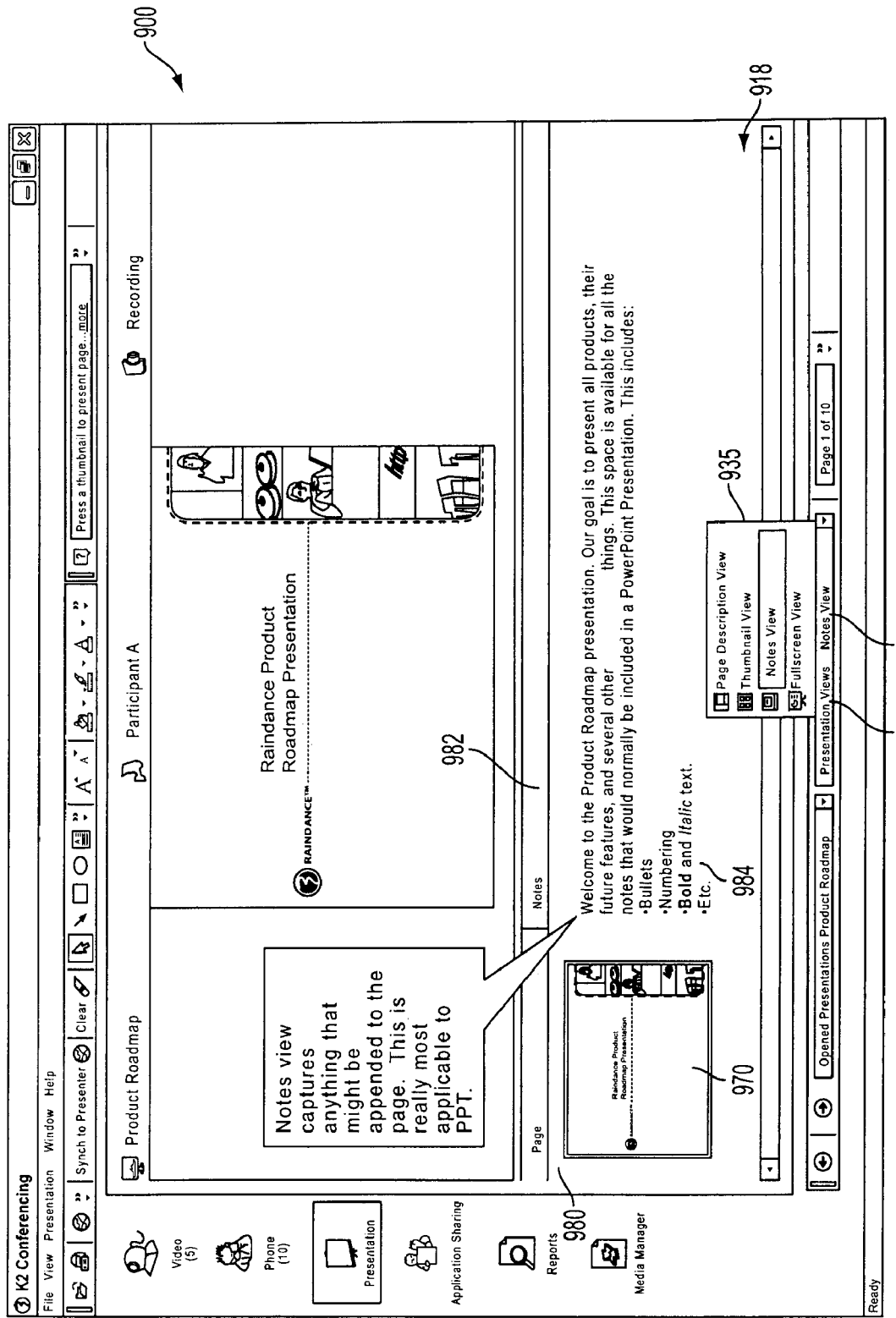
FIG. 9 is an exemplary screen shot illustrating a user interface according to still another embodiment.

An alternative embodiment of a user interface 900 configured in accordance with the systems and methods described herein is illustrated in FIG. 9. In this embodiment, many of the features of user interface 900 are the same as those of user interfaces 600 and 700. Accordingly, only the different features of user interface 800 are discussed in detail.

As illustrated in FIG. 9, user interface 900 includes a live history section 918. But as can be seen, live history section 918 is in a different format than sections 71, and 818 illustrated in FIGS. 7 and 8.

In this embodiment, the options for presentation views control feature 934 are illustrated. A drop-down window 936 includes several options 935, including a page description view, a thumbnail view, a notes view and a full screen view. Further, live history section 918 is illustrated in a notes view format. In this format, live history section 918 can include a page section 980 and a notes section 982. Page section 980 can include a presentation element 970, such as a slide. Notes section 982 can include notes 984 that correspond to the presentation element shown in page section 980. The viewing participant can scroll through any presentation materials in any of the above-identified format options. In alternative embodiments, other formats can be used to display notes or other annotations.

Figure 10:
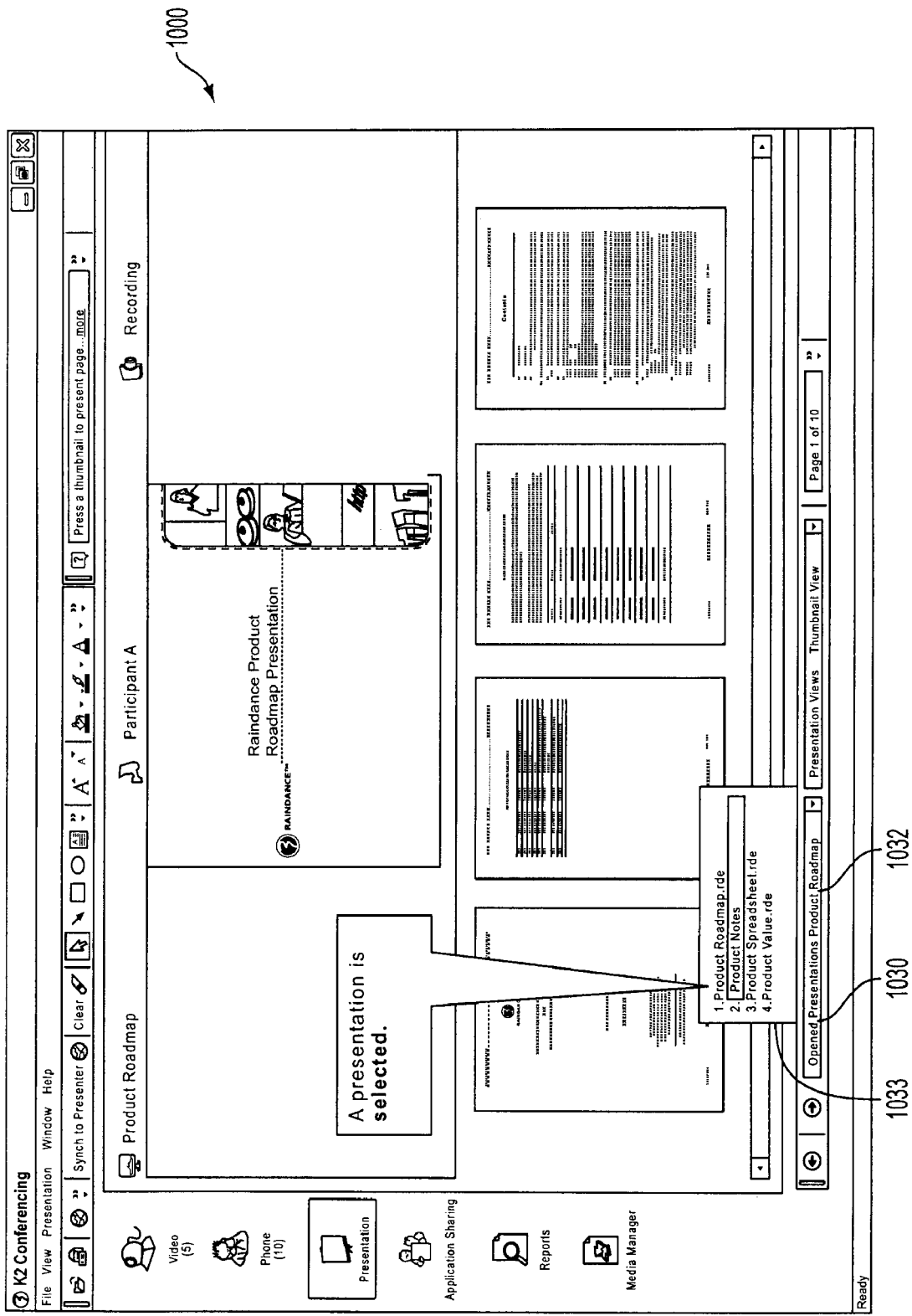
FIG. 10 is an exemplary screen shot illustrating a user interface according to still another embodiment.

An alternative embodiment of a user interface 1000 configured in accordance with the systems and methods described herein is illustrated in FIG. 10. In this embodiment, many of the features of user interface 1000 are the same as those of user interfaces 600 and 700. Accordingly, only the different features of user interface 1000 are discussed in detail.

As illustrated in FIG. 10, user interface 1000 can include an opened presentations section 1030. Opened presentations section 1030 can include a drop-down window 1032 with several options of presentations that have been preloaded and that are available. In this example, there are four options that appear in options window 1033.

The participant viewing user interface 1000 can select one of the presentations to present. In this example, the presentation "Product Notes" is selected. The presentation in the live history section subsequently changed to the "Product Notes" presentation.

Figure 11:
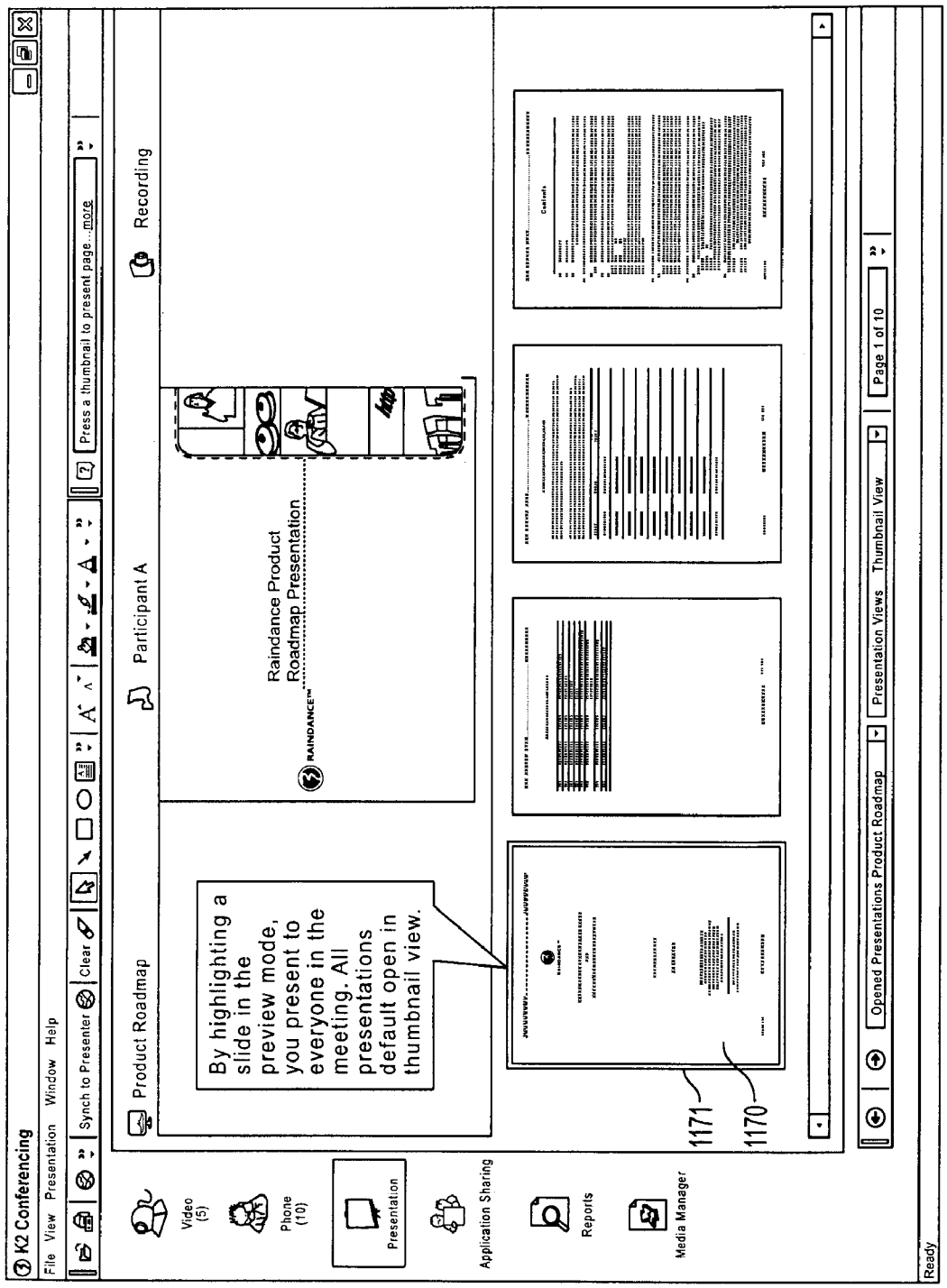
FIG. 11 is an exemplary screen shot illustrating a user interface according to still another embodiment.

An alternative embodiment of a user interface 1100 configured in accordance with the systems and methods described herein is illustrated in FIG. 11. In this embodiment, many of the features of user interface 1100 are the same as those of user interfaces 600 and 700. Accordingly, only the different features of user interface 1100 are discussed in detail.

User interface 1100 corresponds to the view that a participant would have in the preview mode of operation. The preview mode enables a participant to view presentation materials prior to presenting such materials. In this example, the participant can click on or otherwise selects iconic representation 1170 in the live history section. When iconic representation 1170 is selected, a visual indicator can be associated with representation 1170. In one example, the visual indicator can be a border 1171 around the perimeter of representation 1170. A visual indicator can be associated with whichever representation is selected.

In one embodiment, there are different types of access control that can be established or set by the moderator or controller of the collaboration session. The access control can be used to protect presentation materials and control the dissemination or further use of those material. One type of access control can be a shared level in which all participants can take away or have stored to their client device either all or some subset of the presentation materials for that session. Another type of access control can be private access control. In this level, participants cannot view or access any of the meeting materials once the session has been terminated. In this example, the presentation materials would not be stored on the client devices of the participants in the session.

As discussed above, everything that is shared as part of a collaboration session can be saved in private workspace of the interface for each of the participants. Participants can view everything that has been presented on a private basis without affecting the flow of the meeting. When a participant clicks on a particular piece of material that has been presented, that material can be shared to all of the other participants. In one embodiment, when a view clicks on an iconic representation of a presentation element, a warning window such as a pop-up window can be displayed and the viewer prompted to confirm whether that viewer wants to select that presentation element and share it with everyone who is participating in the conference session.

Depending on the embodiment, each presentation element can be selected by any of the participants to present again during the session. In one example, a slide that has been shown more than once during a collaboration session appears in the live history section of the user interface for all of the participants the same number of times that it has be-n presented and in the correct order with respect to the other materials presented. For example, if three different participants hare the same slide, the slide appears four times and in the proper sequential fashion in the live history section of each participant's user interface.

A preview mode can also be included. The preview mode can enable a viewer to view material before presenting it to other viewers. In the preview mode, any participant can view and then select any presentation element to be presented, as described, in certain embodiments, the presentation elements have been already presented.

Any document that can be saved in any type of format can be shared. In one embodiment, web touring can be the format of a particular presentation. Web touring keeps track of each web page that is flipped to in a live history format. In other words, each iconic representation in a live history section corresponds to a particular web page that a presenter has flipped to.

In another embodiment, the particular presentation can be a white boarding session. In a white boarding session, a participant can draw on a board and then save it to the live history so each of the individual participants can view it in the fashion described above. If any document can be captured or any electronic media can be captured, then it can be shared under an application sharing concept.

In one embodiment, the live history shows presentation materials in the order in which they are presented. Many other configurations for presenting the live history are well known. Such configurations can include presenting the live history materials according to the most recently viewed or most frequently viewed presentation. Such presentations could be organized in ascending or descending order, and so on. Accordingly; it should be apparent that the materials may be presented to the viewers in a variety of configurations all of which are consistent with the present invention.

As discussed above, when a presentation element is selected and presented, that element can be broadcast out through relay service to all of the participants connected to a particular conference. The broadcast element can then be captured by each participant's client and displayed in the live area of each participant's user interface. At the same time, a copy of the broadcasted element is stored locally at each participant's client. The storage of the broadcasted element allows a viewer to click through to access a particular broadcasted element. In one embodiment, the broadcasted element can be written to a disk. In another embodiment, the broadcasted element can be retained in memory.

By virtue of the user interface, the preview area has data behind it, and an application that is loaded on the client of each participant forwards any selected data out to the appropriate relay server and to the other end points of each of the participants.

In one embodiment, the iconic representations in the live history section can be associated with hyperlinks to stored documents. This continuously generated list can form a dynamic index of all of the materials that have been presented for a session. In one embodiment, the dynamic list can include materials from any number of presentations. The live history feature of the present invention enables participants to create a new application or a new series of presentations on the fly during a session.

As previously discussed, the iconic representations in the live history section are associated with the presented materials. In one embodiment, the association could be a URL for a video stream. In such an embodiment, a viewer can select any type of player such as Windows media file or a flash presentation. In the live history section of the user interface, a link to a streaming media file can be included.

In general, the live history function can be viewed as an index of presentation material that is created as the session continues. The preview function can then be configured to allow viewers to get ready by selecting a particular presentation element and publishing it to the other participants in the session.

As explained, a control system can be included that provides the ability for a moderator or presenter to determine at what level participants can use presented materials. The participant who publishes a document in a collaboration session can, for example, determine whether that document or presentation element can be saved by the other participants in the collaboration session. In one embodiment, a conference session could be recorded. For example, either or both the audio and/or video data for a particular conference could be recorded. However, as noted above, there is no time element, i.e., no specific timing, that is necessarily associated with a live history saving, as opposed to a recording. In other words, a live history recording can be referred to or can be similar to a set of handouts.

As previously discussed, all slides or presentation elements can be kept either on a disk or on memory at each participant's client, i.e., physically stored on the client devices. Further, materials that are broadcast to all the participants during a session can be kept in a temporary file as a client location. In one embodiment, the temporary file can be encrypted so that a particular key or password or other security element is required from a moderator or other controlling participant in order to access the temporary file and save it to a particular client. An unencrypted file can then be saved to a real location at any directory on the client device. At that time, the temporary file can be deleted from the system. When data is stored in memory, it would allow the data to be written to disk.

Moreover, each presentation element or document can have specified properties. One exemplary property is whether the document itself is savable.

In one embodiment, presentations can be implemented in the format of a metafile that includes information about the presentation and the files in the particular presentation together. The metafile may include properties about a particular presentation element.

In one embodiment, when a participant joins a collaboration session after any material has been presented, the previously presented material is downloaded to the newly joining participant's client by the conferencing system. In an alternative embodiment, all materials that are presented are saved on a server associated with the conferencing session. The saved materials can be downloaded when a new participant joins the session. Alternatively, the saved materials can be transferred to the new participant's client from another client.

Figure 12:
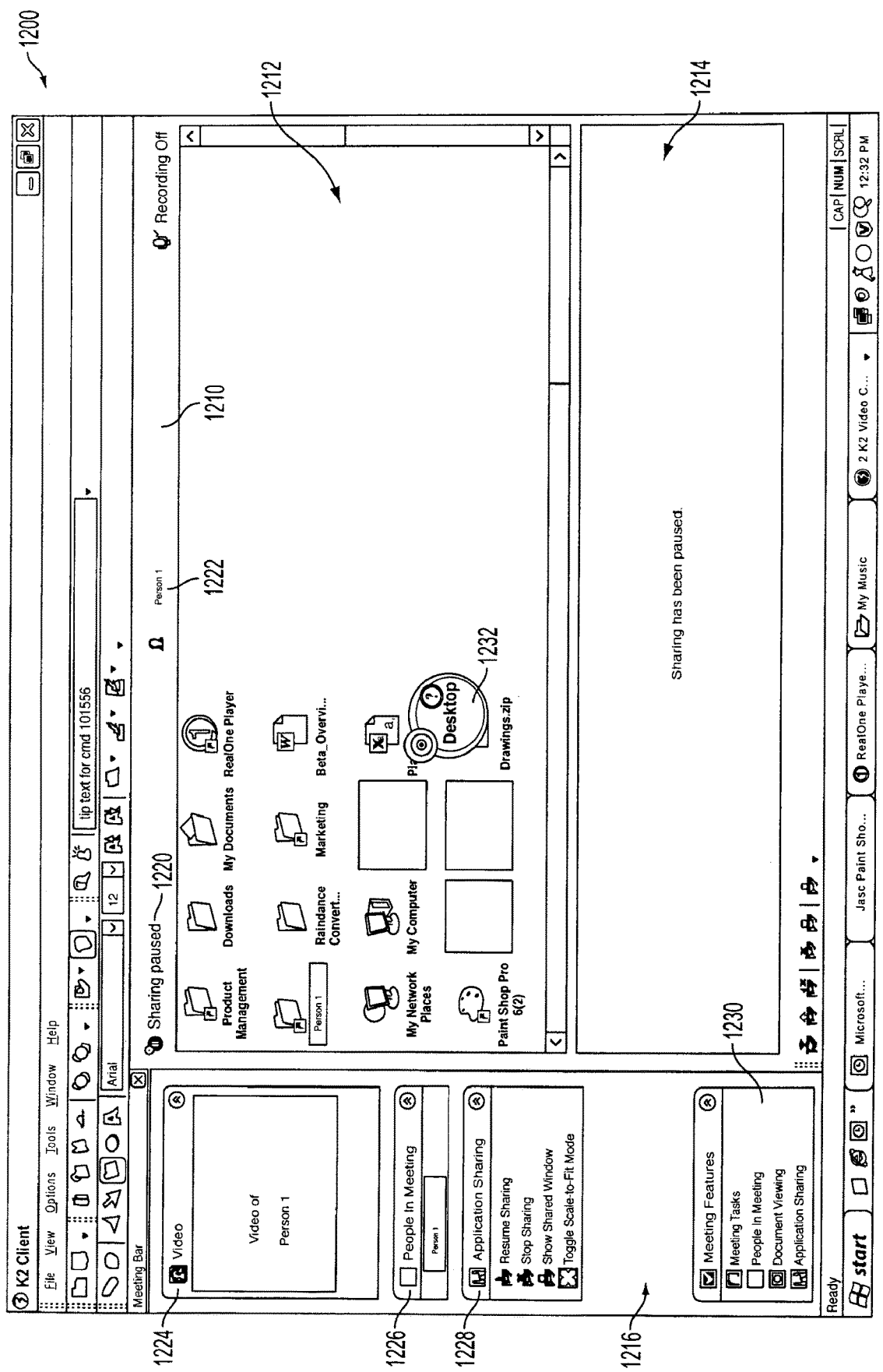
FIG. 12 is an exemplary screen shot illustrating a user interface according to still another embodiment.

An alternative embodiment of a user interface 1200 configured in accordance with the systems and methods described herein is illustrated in FIG. 12. User interface 1200 includes some features and components that are similar in function to the components described above with respect to alternate embodiments of the user interface. It can be appreciated that any combination and/or arrangement of features and components can be used in a user interface according to the invention.

User interface 1200 can include an identification section 1210 that has a status identifier 1220, which in this example shows that the application sharing in this session is paused. The identification section 1210 can include a presenter identifier 1222, which in this example is person 1. In this embodiment, user interface 1200 includes a current area 1212 and a sharing status area 1214.

User interface 1200 also can include a control section 1216. In this embodiment, control section 1216 includes a video feed section 1224 and a people in the meeting section 1226, which in this example shows that only person 1 is joined in the session. The control section 1216 can include an application sharing section 1228 and a meeting features section 1230. Each of these sections can include several options for Lie viewer to control the session. Some of the options are illustrated and are intended to be illustrative only.

User interface 1200 can also include a control mechanism 1232, which in this embodiment is located above a zip icon in area 1212. The control mechanism 932 can be used to control the sharing of applications in the session.

Figure 13:
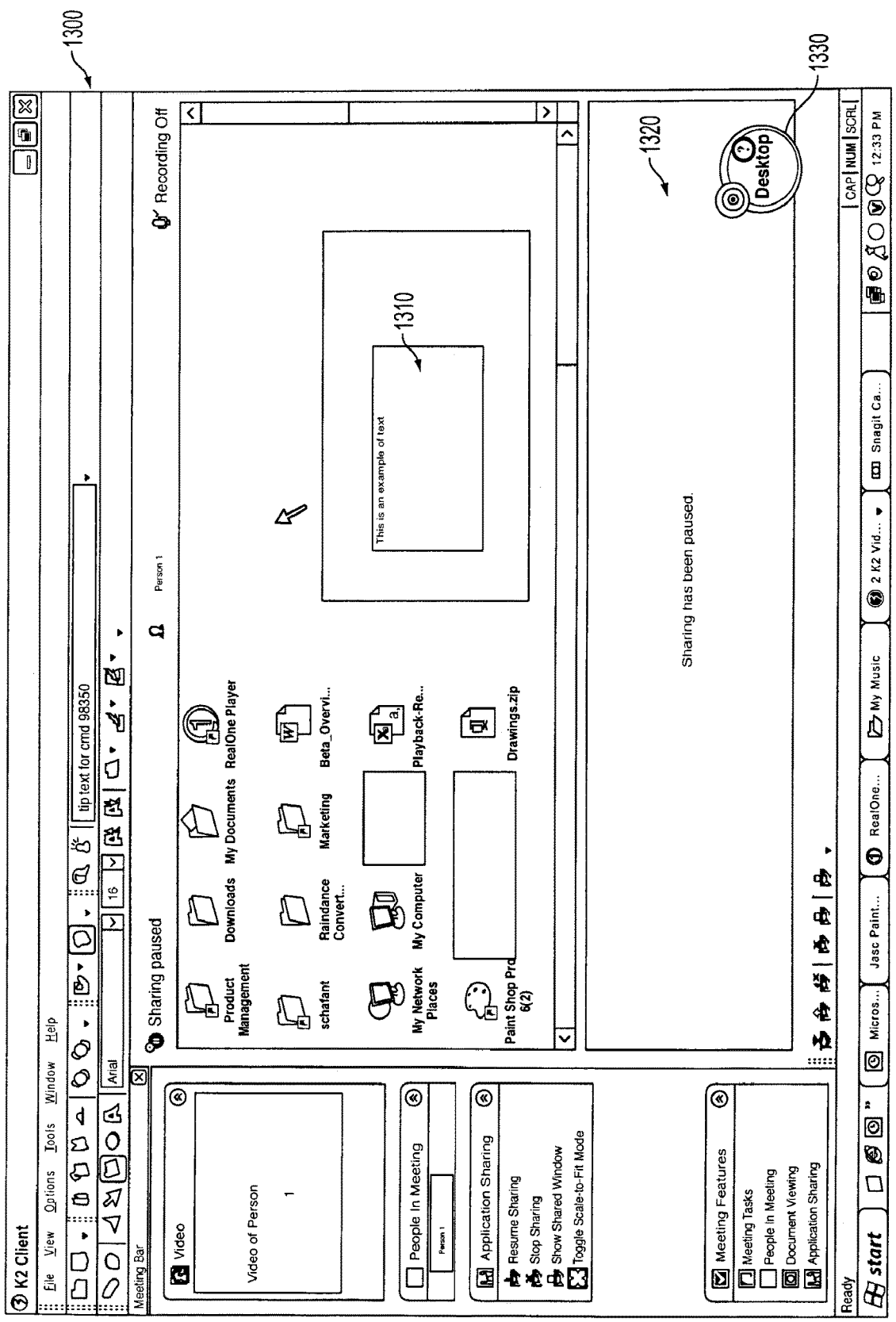
FIG. 13 is an exemplary screen shot illustrating a user interface according to still another embodiment.

An alternative embodiment of a user interface 1300 configured in accordance with the systems and methods described herein is illustrated in FIG. 13. In this embodiment, user interface 1300 includes a text entry box 1310 in the current area. User interface 1300 also includes a status area 1320 configured to indicate that the application sharing in this collaborative session has been paused. As a result, control mechanism 1330 is moved over a portion of the status area 1320.

Figure 14:
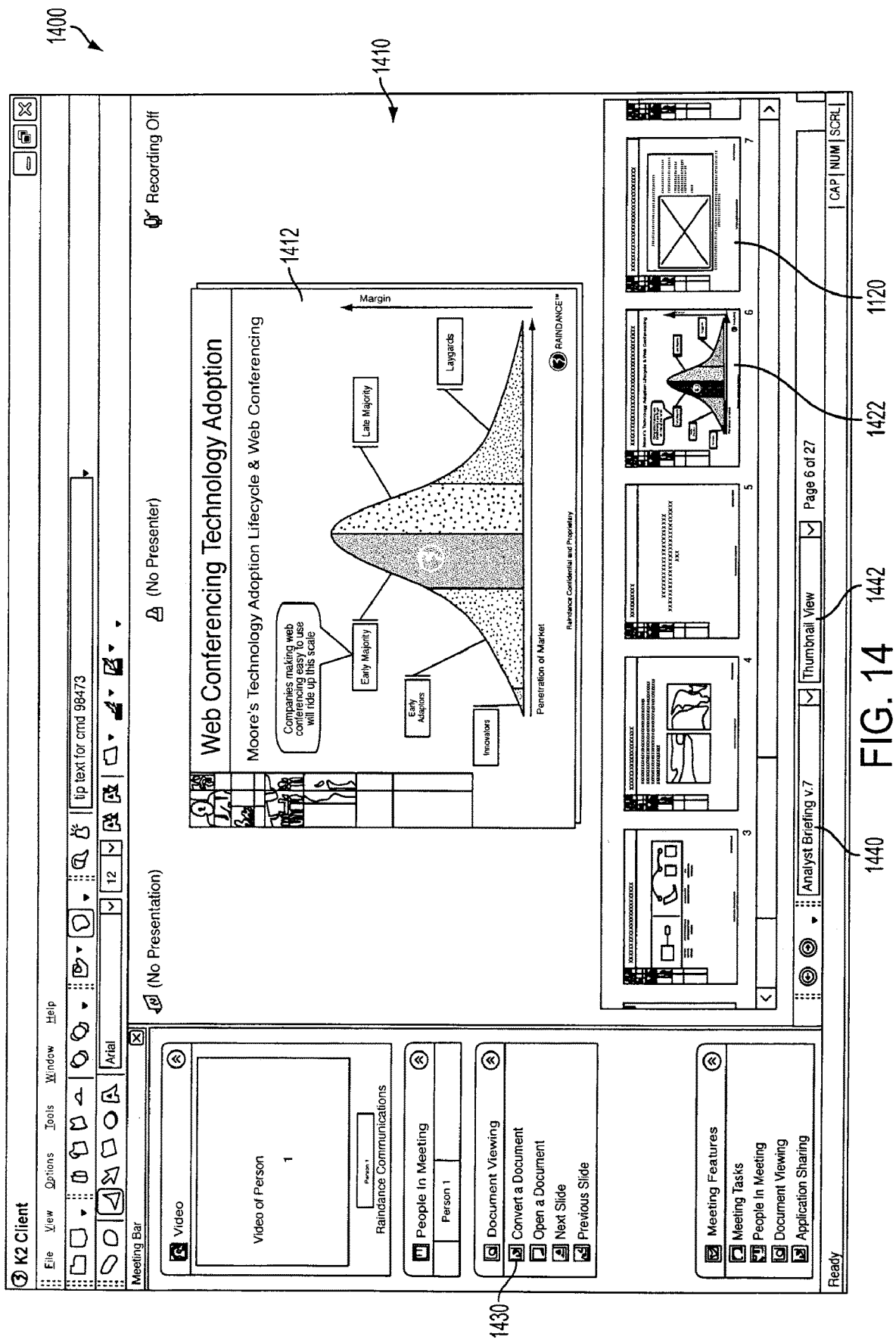
FIG. 14 is an exemplary screen shot illustrating a user interface according to still another embodiment.

An alternative embodiment of a user interface 1400 configured in accordance with the systems and methods described herein is illustrated in FIG. 14. User interface 1400 includes a current display or presentation area 1410 in which a media element 1412, such as a slide, is displayed. In this embodiment, the control section of user interface 1400 includes a document viewing control feature 1430. The document viewing control feature 1430 can have several options for a participant to control the viewing of a document. In alternative embodiments, other options can be facilitated for participants in the document viewing control feature 1430.

User interface 1400 includes a live history or preview area 1420 in which several iconic representations are displayed. Representation 1422 has a border or shading around its perimeter to indicate that it is being displayed in area 1410.

Figure 21:
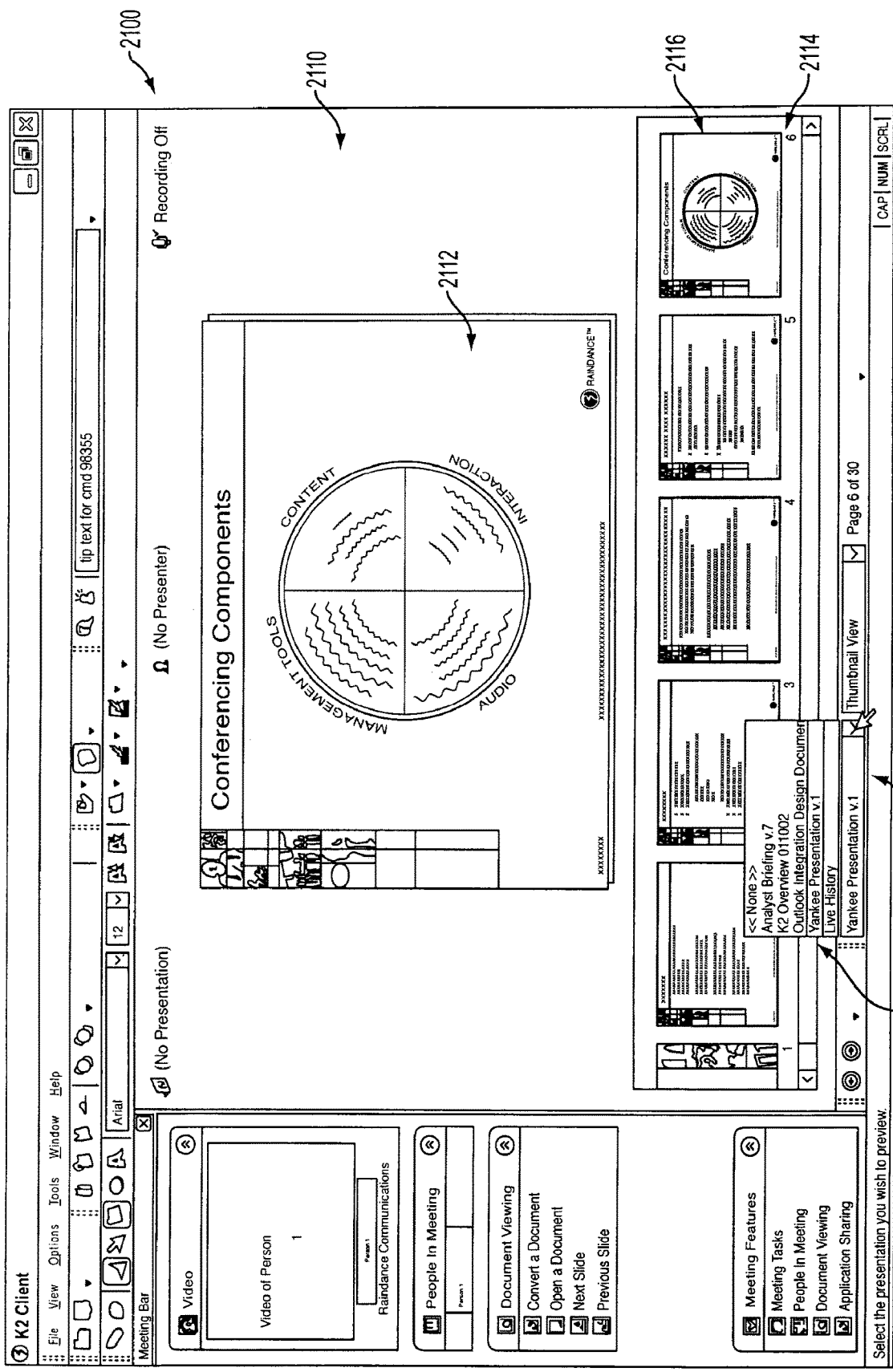
FIG. 21 is an exemplary, screen shot illustrating a user interface according to still another embodiment.

User interface 1400 can also include a drop down window 1440 in which the presentations and/or modes of viewing can be presented to the participant. Referring to FIG. 21, for example, user interface 2100 illustrates several options 2118 in drop-down window 2120, which can correspond to options in drop-down window 1440. Components 2110, 2112, 2114 and 2116 can also be similar to the corresponding components in user interface 1400.

Figure 22:
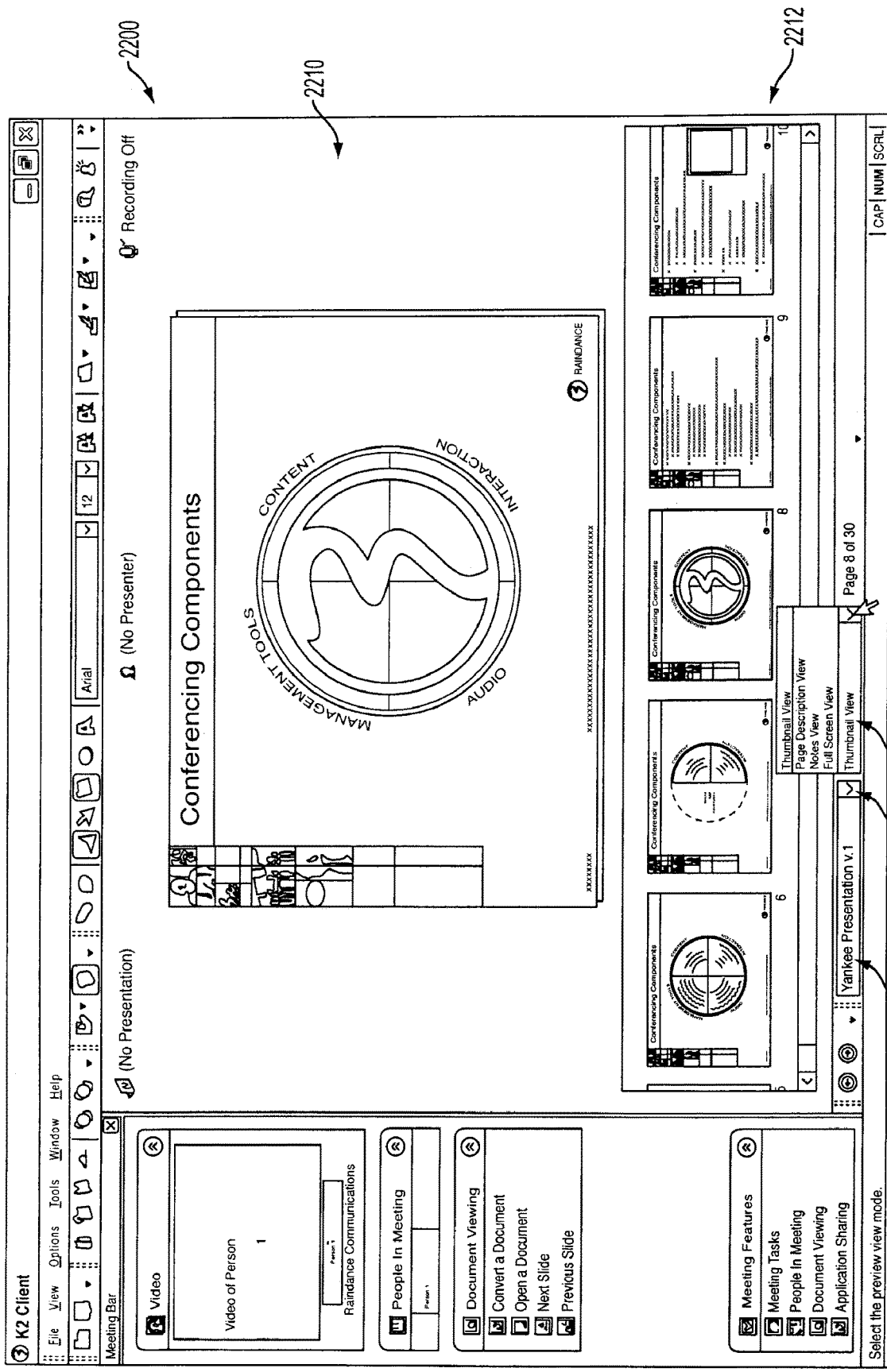
FIG. 22 is an exemplary screen shot illustrating a user interface according to still another embodiment.

User interface 1400 also can include a drop down window 1442 in which several options of the format of the displayed materials can be presented to the participant. Referring to FIG. 22, user interface 2200 also includes several options 2216 in dropdown window 2218, which can correspond to the options in window 1442. Components 2210, 2212 and 2214 can thus be similar to the corresponding component, in user interface 1400.

Figure 15:
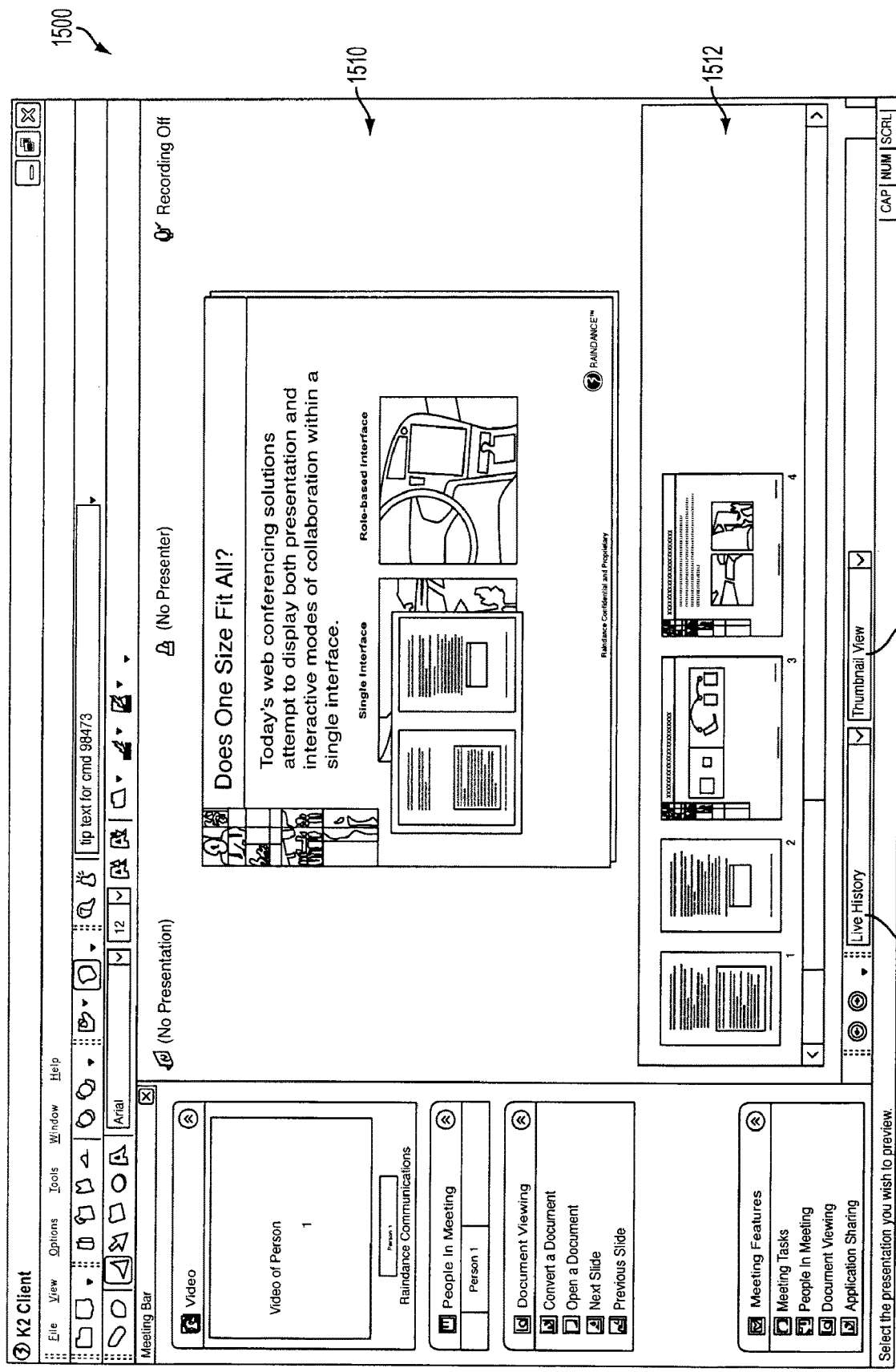
FIG. 15 is an exemplary screen shot illustrating a user inter ace according to still another embodiment.

An alternative embodiment of a user interface 1500 configured in accordance with the systems and methods described herein is illustrated in FIG. 15. User interface 1500 includes a current presentation area 1510 and a live history or preview area 1512. Here, presentation selection window 1514 has been moved to the Live History mode. The view of the Live History elements is a thumbnail view 1516.

Figure 16:
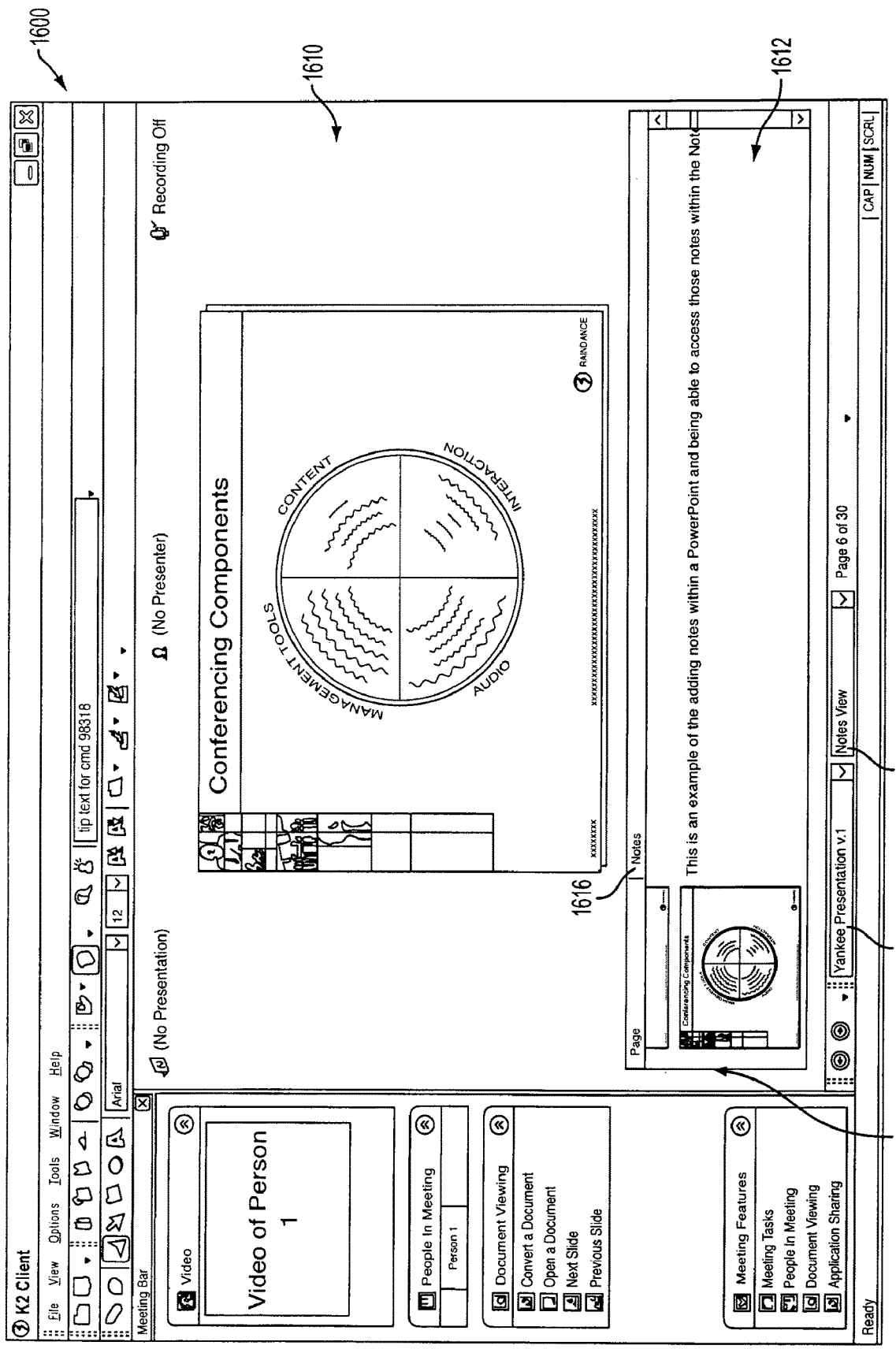
FIG. 16 is an exemplary screen shot illustrating a user interface according to still another embodiment.

An alternative embodiment of a user interface 1600 configured in accordance with the systems and methods described herein is illustrated in FIG. 16. User interface 1600 includes a current presentation section or area 1610 and a live history or preview area 1612. In this embodiment, preview area 1612 has been changed to a Notes view, as indicated in window 1620. In the Notes view, preview area 1612 has a page section 1614 in which iconic representations of presentation materials are illustrated. Preview area 1612 includes a notes section 1616 in which notes can be input an(: reviewed proximate to the associated presentation element. In alternative embodiments, the content and arrangement of preview area 1612 can vary for each view format.

Figure 17:
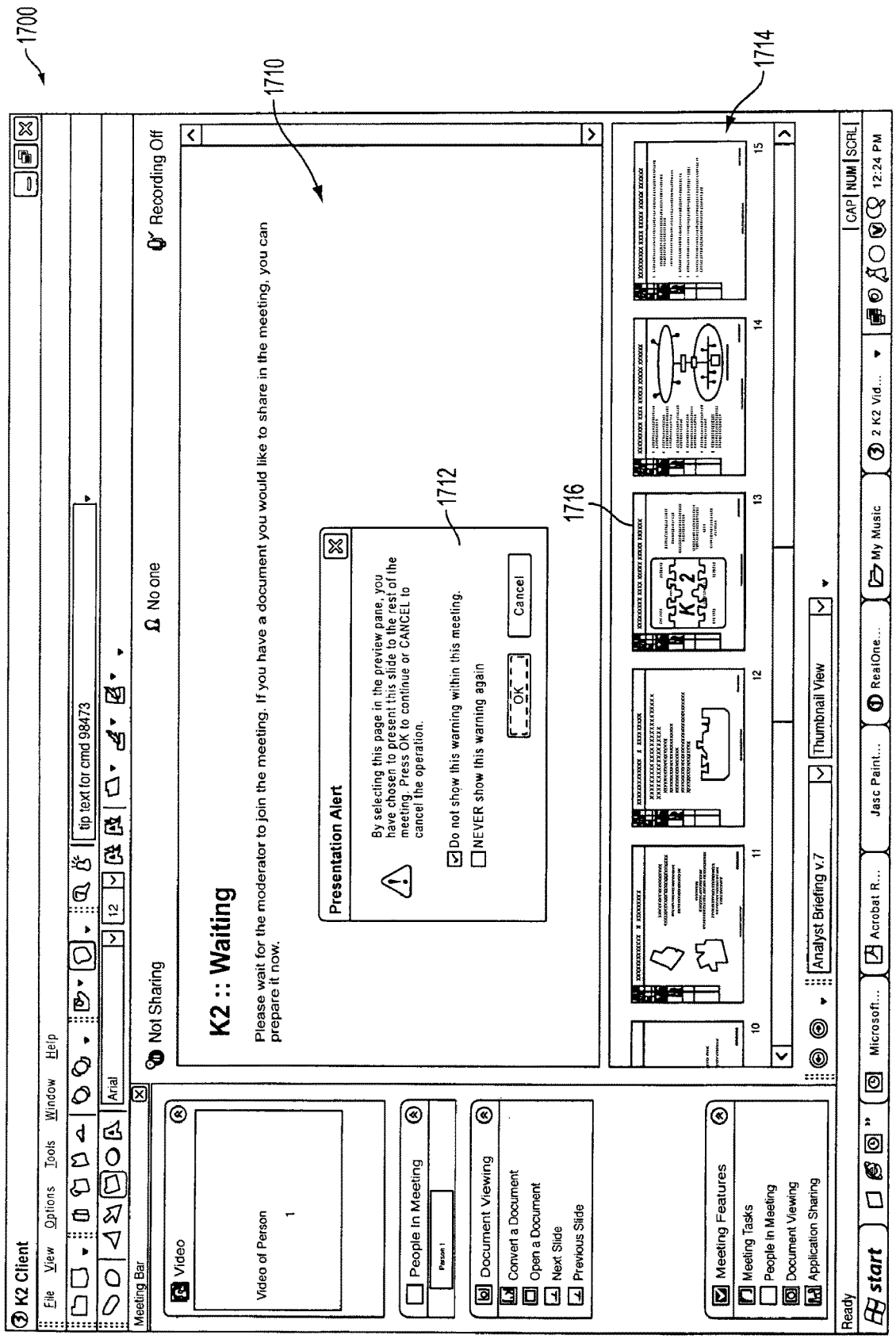
FIG. 17 is an exemplary screen shot illustrating a user interface according to still another embodiment.

An alternative embodiment of a user interface 1700 configured in accordance with the systems and methods described herein is illustrated in FIG. 17. Uses interface 1700 includes a current presentation area 1710 and a preview area 1714. In this example, a participant has selected presentation element 1716 to share it with the other participants. The system can be configured to then prompt the participant with an alert, which in this example is a pop-up window 1712. The alert informs the participant that the selected presentation element will be sent to all of the connected participants.

Figure 18:
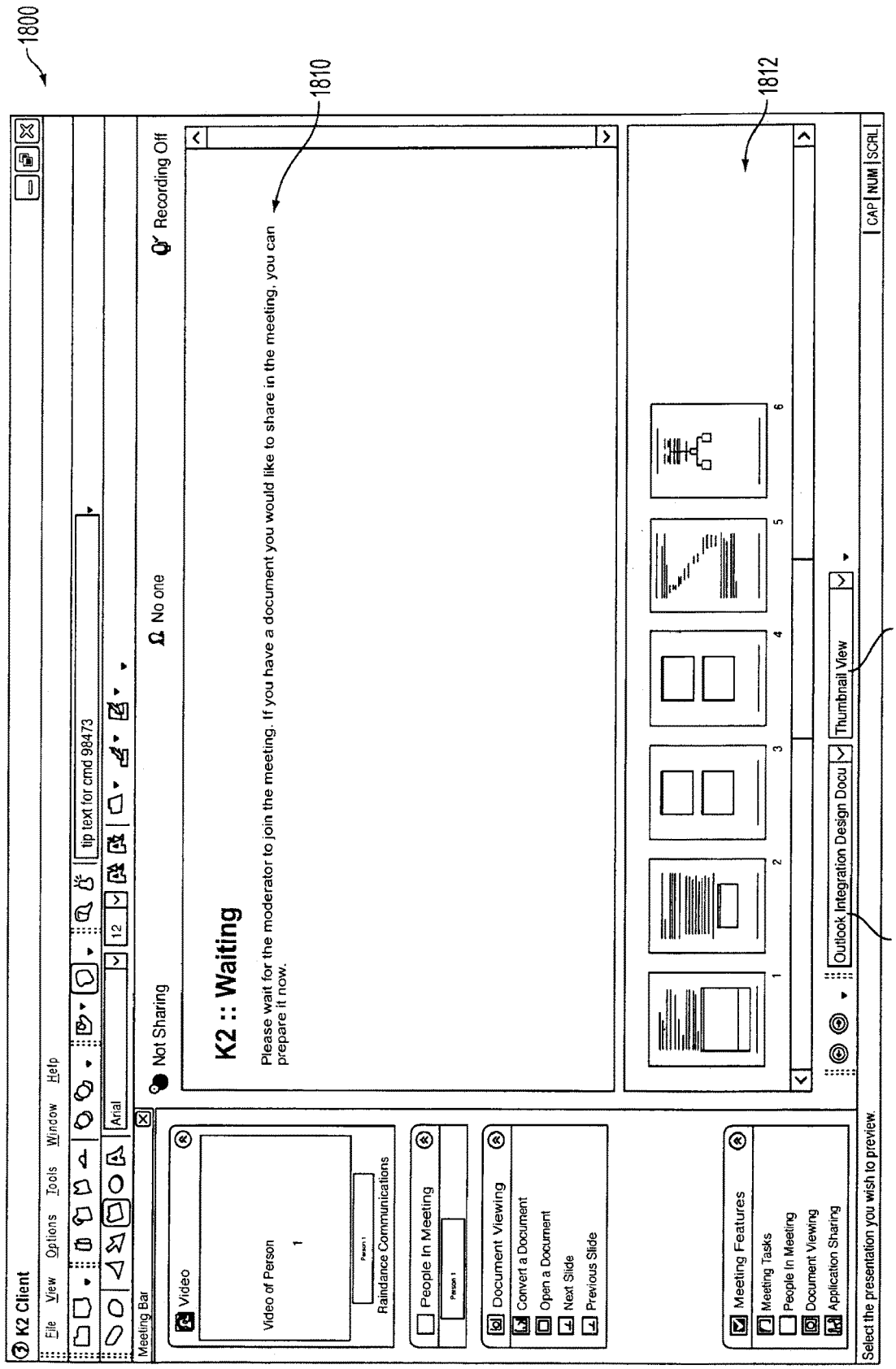
FIG. 18 is an exemplary screen shot illustrating a user interface according to still another embodiment.

An alternative embodiment of a user interface 1800 configured iii accordance with the systems and methods described herein is illustrated in FIG. 18. User interface 1800 includes a current presentation area 1810 and a preview area 1812. This embodiment also includes presentation selection window 1814 and the format view 1816.

Figure 19:
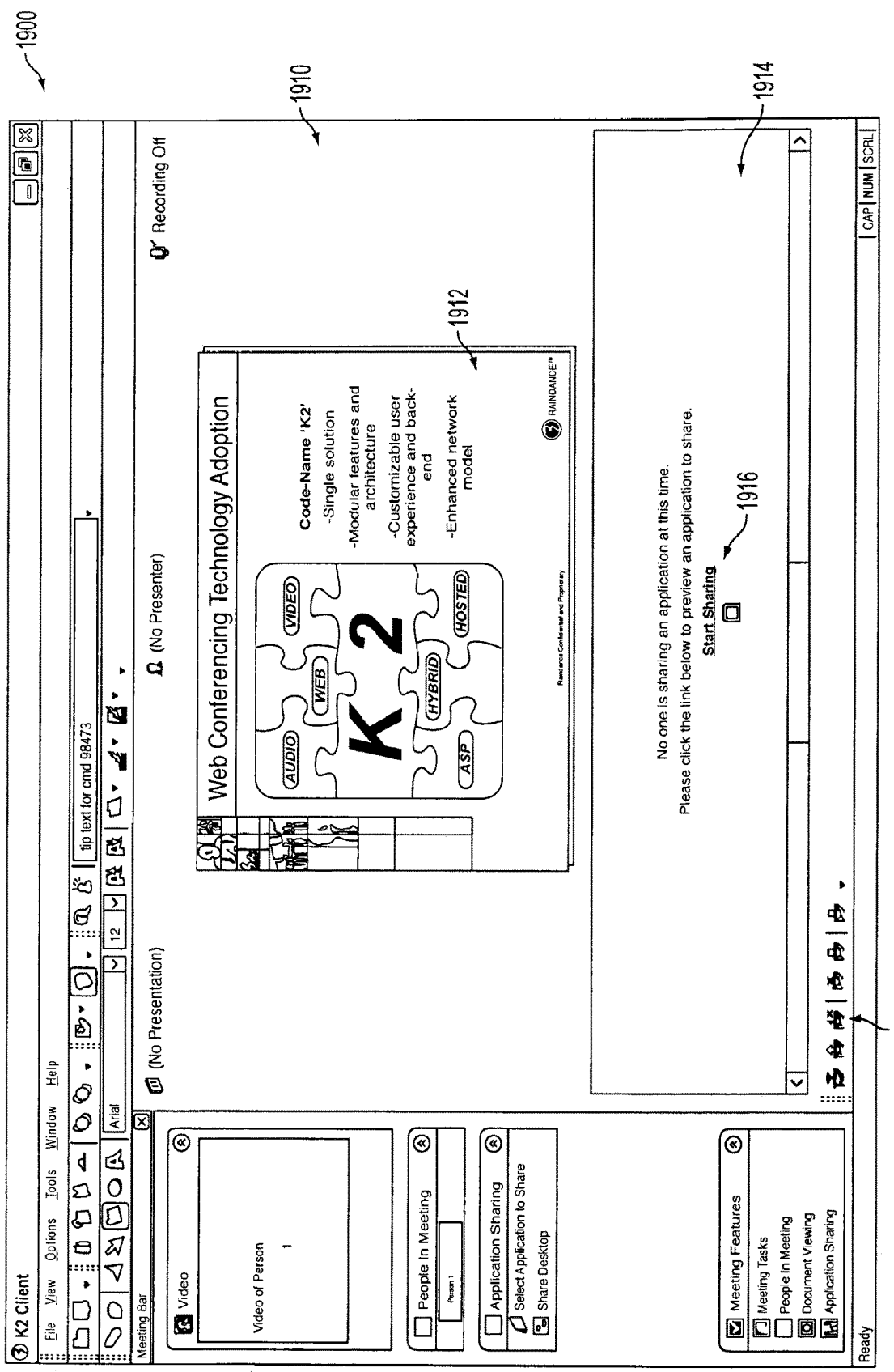
FIG. 19 is an exemplary screen shot illustrating a user interface according to still another embodiment.

An alternative embodiment of a user interface 1900 configured in accordance with the systems and methods described herein is illustrated in FIG. 19. User interface 1900 includes a current presentation area 1910 in which a presentation element 1912 is displayed. User interface 1900 also includes a preview area 1914 in which a link to an application to share with other participants is provided. Link 1916 can be associated with one or more applications. Alternatively, link 1916 can be associated with a control mechanism that can be manipulated by a participant to select an application to be shared. User interface 1900 also includes a control menu 1920.

Figure 20:
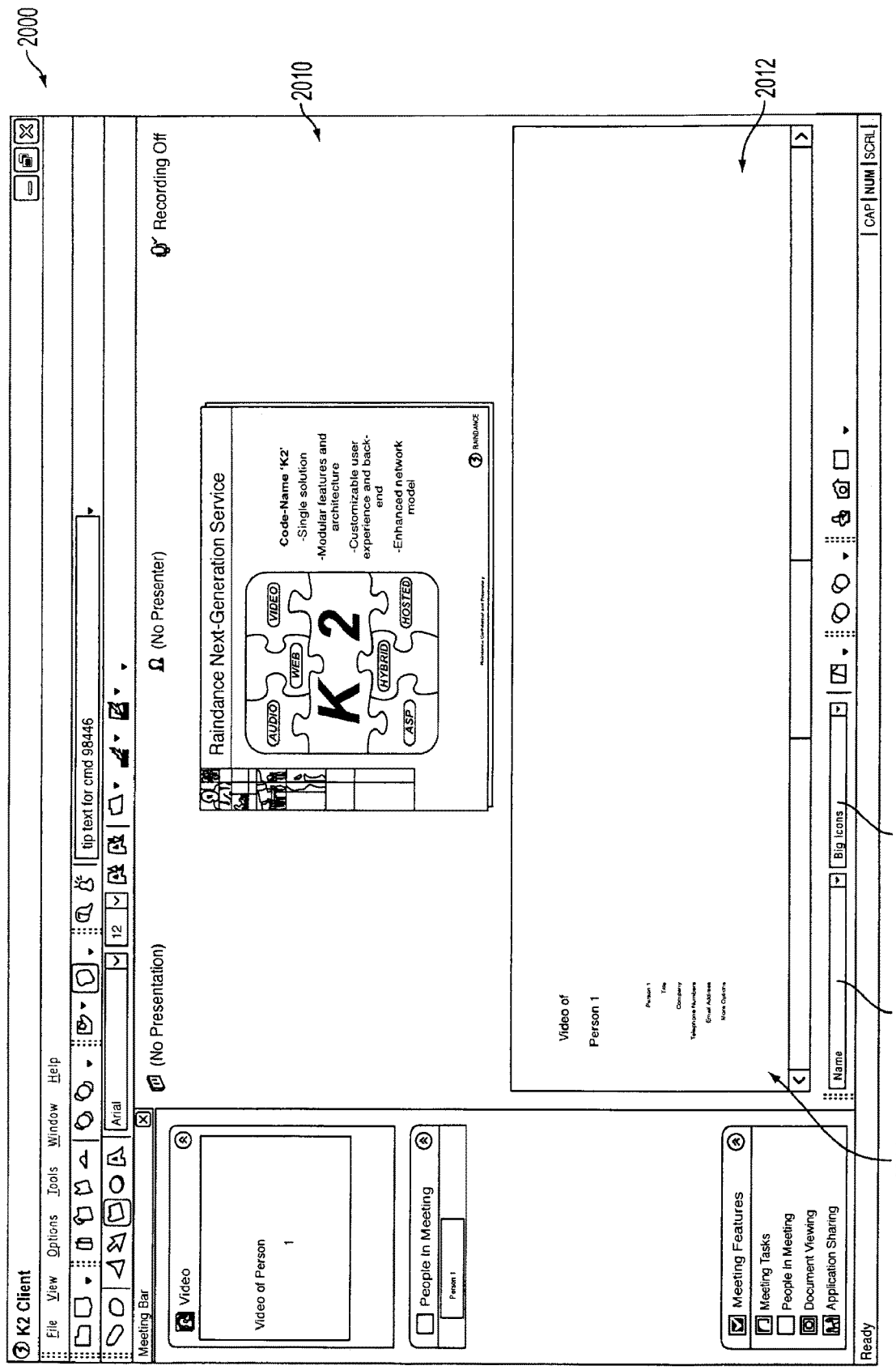
FIG. 20 is an exemplary screen shot illustrating a user interface according to still another embodiment.

An alternative embodiment of a user interface 2000 configured in accordance with the systems and methods described herein is illustrated in FIG. 20. User interface 2000 includes a current presentation area 2010 and a preview area 2012. In this embodiment, preview area 2012 is illustrated in a name mode as indicated by window 2016. The format of preview area 2012 in this example is big icons, as shown it, window 2018.

Preview area 2012 can include information 2014 relating to a participant who has joined the session. Information 2014 can include a video feed or still video data of a participant, such as person 1 in this example. Other information can include the name, title, company, phone number and email address of the participant. A link to additional options and/or information can be provided as well.

It is intended that the above described embodiments of user interfaces be exemplary of the various features, functions, configurations and components that can be included in a user interface and the conferencing system according to the present invention. In various embodiments, the conferencing system and the user interfaces associated with the conferencing system can provide any combination of configurations, components, features, etc.

In one embodiment of the conferencing system, a live document can be dynamically formed as a conference session proceeds. The live document can contain all of the elements presented from the start of the session to the current point of the session. In an alternative embodiment, the live document can include a subset of all of the presented elements.

In one embodiment, the conferencing system can include the ability to view the live document, as well as other documents, in a preview window or area. The preview area can be configured to automatically display a hyperlinked icon for every presented element. The hyperlinked icon can be configured to facilitate navigation by a participant by allowing clicking to a particular document. In one embodiment, the conferencing system includes the ability to view or share any presentation element in the preview window by simply clicking on the icon.

In one embodiment, every participant sees the live information that is published by one participant. Some of the user interfaces described above included a private preview area in which information can be privately viewed prior to sharing it with the participants in the session. One of the documents that can be viewed in the private area is the live history, which is the live document that is dynamically created as described above.

Figure 23:
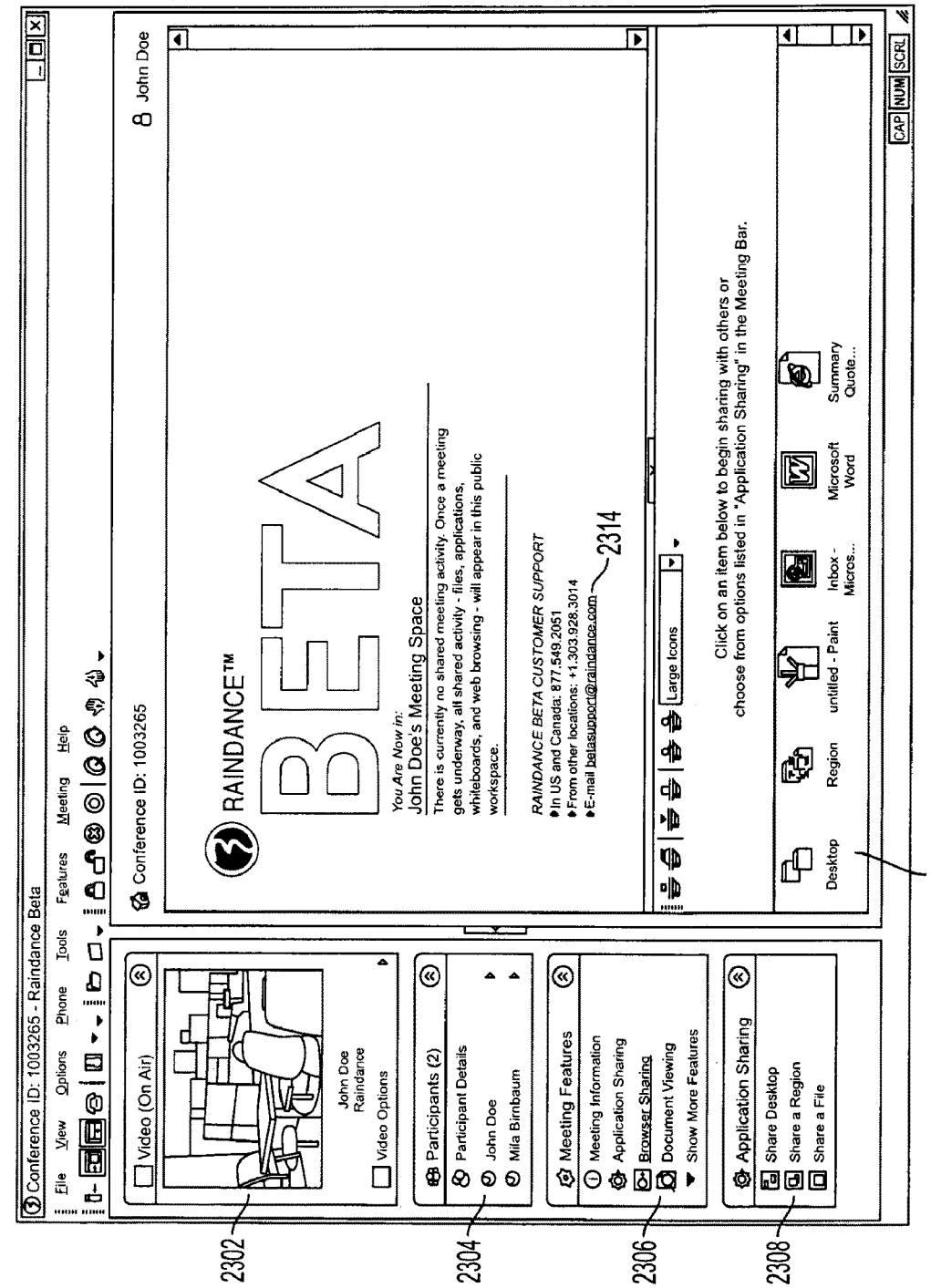
FIG. 23 is an exemplary screen shot illustrating a user interface according to still another embodiment.

FIG. 23 is a screen shot illustrating an alternative embodiment of a user interface 2300 that can be used in a collaborative communication system configured in accordance with the systems and methods described herein. As can be seen, user interface includes a public workspace 2310 and a private workspace 2308. As before, material being shared in a collaborative communication session can be displayed in public workspace 2310, and material being viewed only by the participant associated with the device displaying user interface 2300 can be viewed in private workspace 2308. In this embodiment, however, a list 2306 of features can be included. If the participant clicks on one of the features, material, or a view, associated with the feature can be displayed in public workspace 2310.

As mentioned above, user interface 2300 also includes a video display area 2302 and a list of participants and their capabilities in area 2304. Further, user interface 2300 can also provide the ability for the participant to force all other participants to switch to view the participant's video stream. This is similar to a participant taking the podium in a conference setting. In one embodiment, when, e.g., participant A is on the podium, other participants cannot switch away from A's video, until A gives up the podium. However, in other embodiments, any participant can take the podium, at any time. This provides for more egalitarian interaction. For example, if participant A has the podium all participants will be viewing A's video. If participant B then takes the podium, this causes A to automatically give up the podium, and all participants will switch to viewing B's video.

The list 2304 of participants presented in the user interface 2300 can also include information about which participants are connected to the collaboration session on an audio basis. Note that this display can include participants that are only on the phone, as well as those that are both on the phone and also connected to the data portion of the collaboration session. The user interface 2300 can also allow a participant to select another participant from the list of participants 2304 and execute an audio operation on that participant. For example, the user can mute an unmute the participant's audio line, or disconnect the participant from the audio portion of the collaboration session The user interface 2300 can also include an application sharing link, or icon, e.g. in private workspace 2312. Depending on the embodiment, the participant can click on the application sharing link, when the user wants to share an application, a document, a rectangular region or the entire user's desktop. In one embodiment, the private workspace can be populated with iconic representations of all of the applications currently running on the participant's desktop, along with icons that represent the desktop itself and a region share icon. If the participant clicks one of these icons, the associated application, region or entire desktop, can be selected and shared with the other participants in the collaborative session. If region sharing is selected, a rectangular border can, for example, be displayed which defines the region of the desktop that will be shared. The participant can then, depending on the embodiment, stretch this region both vertically and horizontally, to change the size and shape of the shared region.

The user interface 2300 can also include a media manager link, or icon. If the participant plans to share media in a particular format, the participant can click on the media manager link and prepare the materials in the particular format desired.

Figure 24:
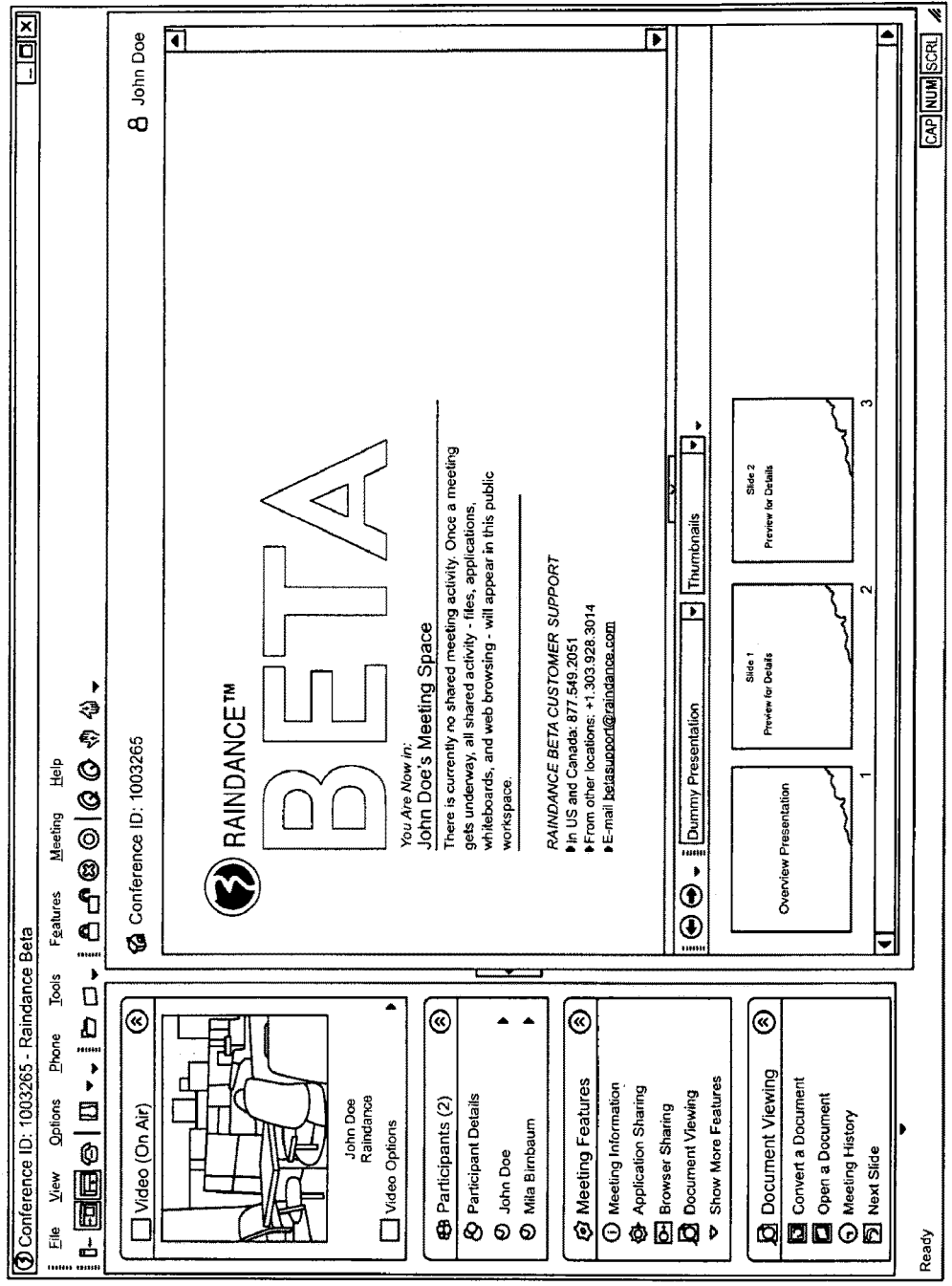
FIG. 24 is an exemplary screen shot illustrating a user interface according to still another embodiment.
Figure 25:
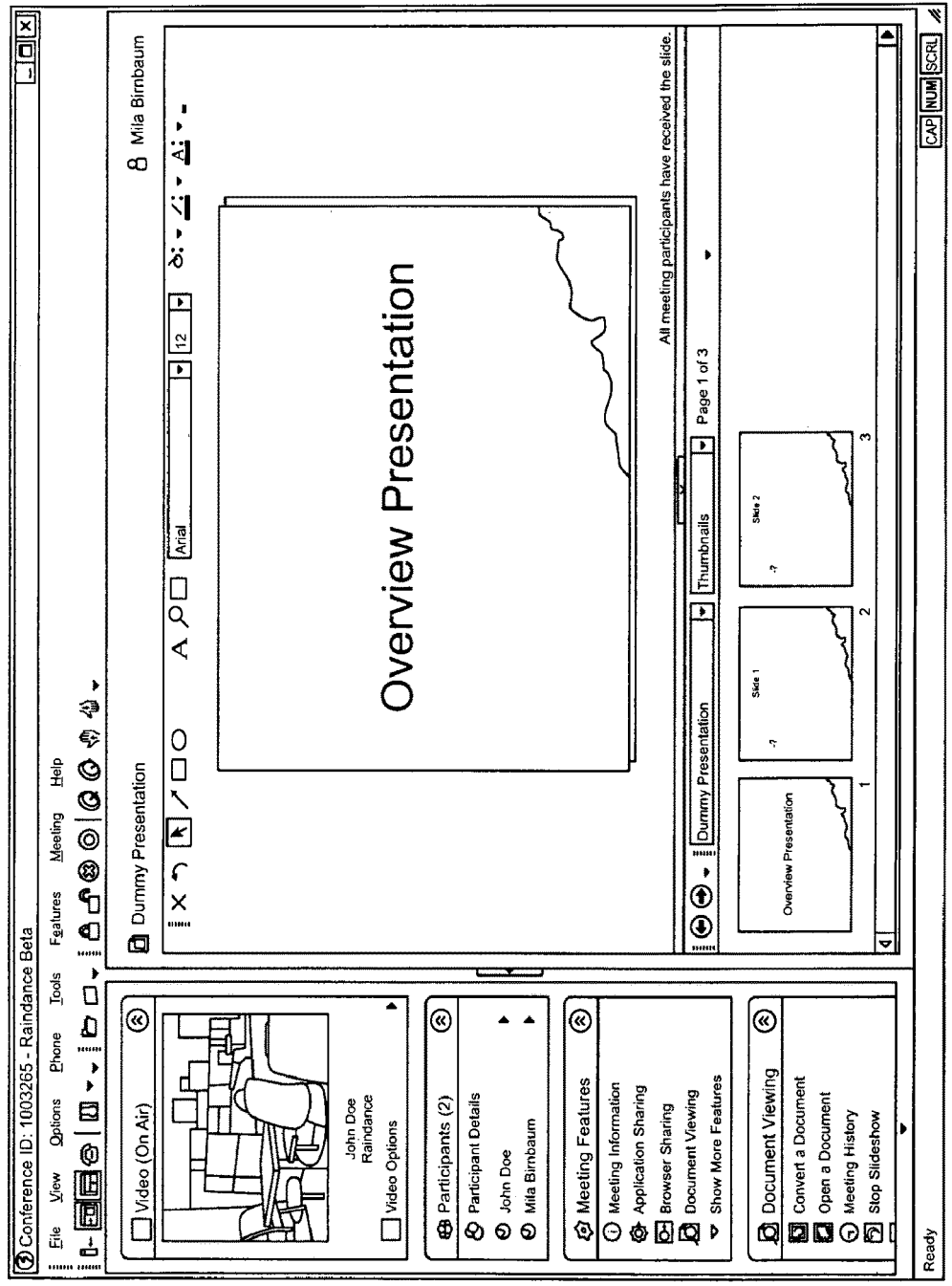
FIG. 25 is an exemplary screen shot illustrating a user interface according to still another embodiment.
Figure 26:
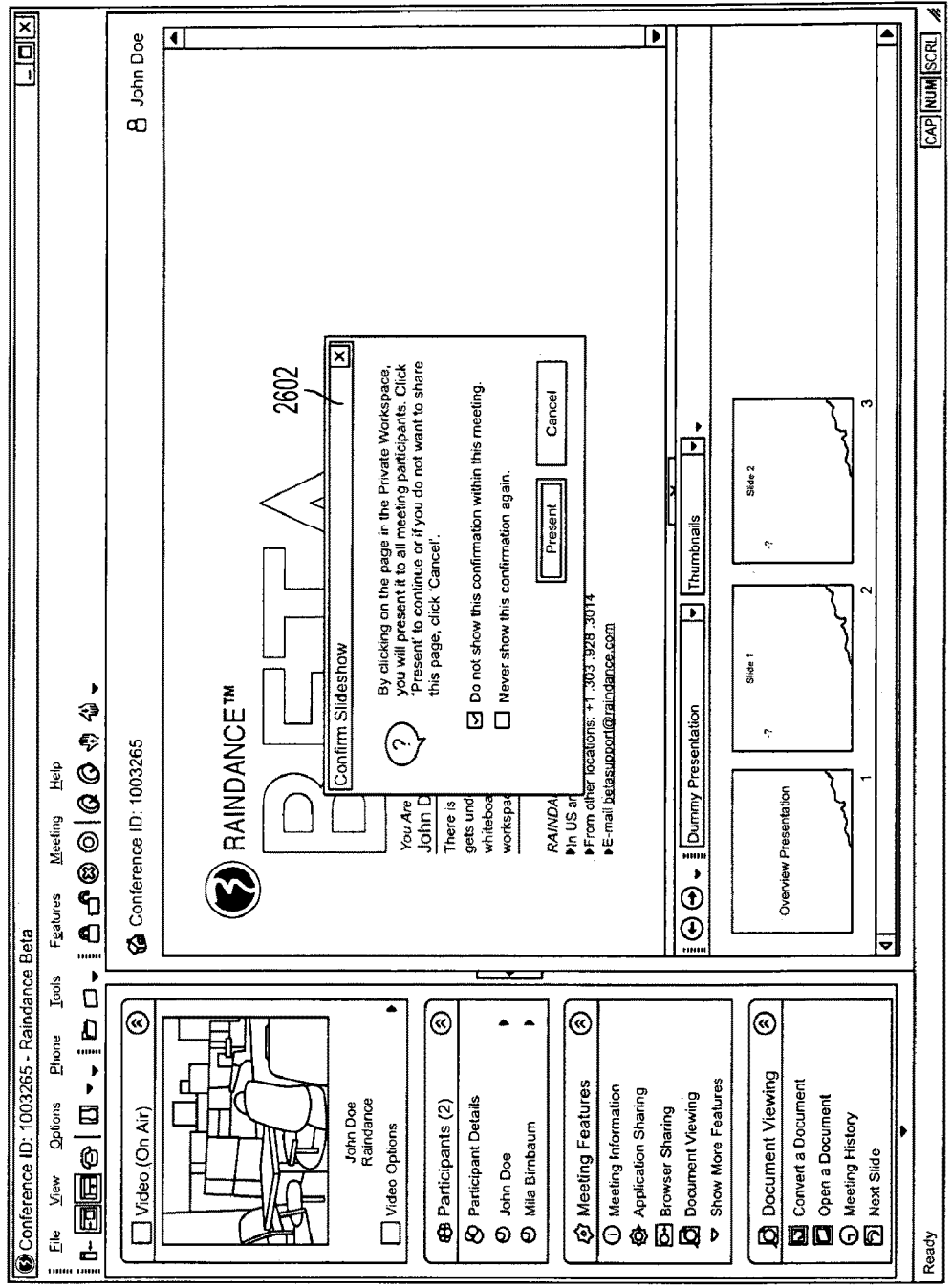
FIG. 26 is an exemplary screen shot illustrating a user interface according to still another embodiment.

The user interface 2300 can also include a document viewing link, or icon, as illustrated in FIG. 24. In such embodiments, the participant can click on the document viewing link when the participant wishes to share a converted presentation in the collaborative session. In one embodiment, clicking this link allows the participant to select a presentation from a list of previously accessed presentations. When a presentation is selected, the various pages of the presentation are displayed in the private workspace, and can be reviewed privately by the participant as illustrated in FIG. 24. These pages, or slides, can then be selected by the viewer to be pushed into the public workspace so that all participants in the collaborative session see the slide, or page, as illustrates in FIG. 25. First, however, a warning dialogue box 2602 can be displayed to warn the participant before he sends the presentation to the public workspace as illustrated in FIG. 26.

While certain embodiments of the inventions have been described above, it will be understood that the embodiments described are by way of example only. Accordingly, the inventions should not be limited based on the described embodiments. Thus, the scope of the inventions described herein should only be limited in light of the claims that follow when taken in conjunction with the above description and accompanying drawings.

The invention claimed is:

1. A system, comprising:
a central server;
a plurality of client devices operated by a plurality of participants;
a session controlled by the central server comprising the plurality of participants which are participating via their respective client devices, each client device having equal access and control of the session and each client device is provided with private communications directly with another client device;
a presentation control of the session operated by the central server;
a viewer control of the session operated by the central server;
at least one display section on each of the client devices that continuously displays live history information of presented elements that have been previously presented in the session, wherein the live history information is a series of iconic representations that continuously scrolls;
generating a live history dynamic list of the live history information; and hyperlinking iconic representations of the presented elements;
wherein when created information is shared by the one of the plurality of participants the created information is broadcast via the central server to include at least one link to a section that stores the created information;
wherein an individual presentation space is at least one of individually and collectively viewed during the session; and
wherein the broadcast is based on a control command that includes information to broadcast the created information and wherein the broadcast created information is provided to each of the plurality of participants and displayed in each of the plurality of participants' client devices and a copy of the created information is stored at each of the plurality of participant's client devices.

2. The system of claim 1, wherein each of the plurality of participants is assigned equal privilege levels.

3. The system of claim 1, wherein a presenter role can be assumed by any of the plurality of participants at any time during the session.

4. The system of claim 1, wherein the information can be shared freely under the presentation control of any of the plurality of participants.

5. The system of claim 1, wherein the information can comprise any type of media supported by a network.

6. The system of claim 1, wherein the plurality of participants designate which of the plurality of participants will act as a presenter.

7. The system of claim 1, wherein the session is configured to allow multiple presentations to be presented by the plurality of participants at the same time.

8. The system of claim 1, wherein the session comprises a private preview area for each of the plurality of participants.

9. The system of claim 8, wherein the information is privately viewed prior to sharing the information with other of the plurality of participants in the session.

10. The system of claim 1, further comprising a central shared presentation area that can be controlled by any one of the plurality of participants at any time.

11. The system of claim 1, wherein the central server is interfaced with a network and is configured to coordinate distribution of media streams associated with the session between the plurality of participants.

12. The system of claim 1, wherein each of the plurality of participants are able to speak with any of the other participants at any time.

13. A method, comprising:
connecting client devices participating in a session, each client device having equal access and control of the session and each client device is provided with private communications directly with another client device;
continuously displaying a list of live history information of presented elements that have been previously presented in the session on at least one of the client devices of the session, wherein the live history information is a series of iconic representations that continuously scrolls;
generating a live history dynamic list of the live history information;
hyperlinking iconic representations of the presented elements;
enabling each of the client devices in the session to view at least a part of the previously presented information, wherein each of the client devices is configured to create information wherein an individual presentation space is at least one of individually and collectively viewed during the session; and
broadcasting the created information between the client devices, wherein the broadcasting is based on a control command that includes information to broadcast the created information and wherein the broadcast created information is provided to each of the client devices and a copy of the created information is stored at each of the client devices.

14. A system, comprising:
a plurality of participants operating respective participant devices; and
a session controlled by a central server comprising the plurality of participants which are participating via their respective client devices, each client device having equal access and control of the session and each client device is provided with private communications directly with another client device, wherein each of the plurality of participants have no pre-assigned hierarchical role during the operation of the session, and have full privileges to share information during the operation of the session, wherein when the information is shared by one of the participants with at least another one of the participants, wherein a list of live history information that has been previously presented in the session on at least one of the client devices of the session is continuously displayed, wherein the live history information of presented elements is a series of iconic representations that continuously scrolls, wherein a live history dynamic list of the live history information is generated; and wherein iconic representations of presented elements are hyperlinked, the information is broadcast to each of the participants' devices, wherein the broadcast is based on a control command that includes information to broadcast the information being presented, wherein the broadcast information is provided to each of the plurality of participants and displayed at each of the plurality of participant devices and a copy of the broadcast information is stored at each of the plurality participant devices and wherein an individual presentation space is at least one of individually and collectively viewed during the session.

15. The system of claim 14, further comprising a media type control that allows each of the participants to dynamically select a media type for the information to be broadcast.

16. The system of claim 14, further comprising a media type control that allows each of the participants to dynamically select a media type for the information to be viewed.

17. The system of claim 14, further comprising a display interface configured to display information that has been previously presented in the session.

18. The system of claim 17, wherein the display information that has been previously presented in the session can be viewed by each of the plurality of participants.

19. The system of claim 14, wherein each of the plurality of participants can create their own presentation space within the session.

20. The system of claim 14, wherein the session comprises a private preview area for each of the plurality of participants in which information is configured to be privately viewed prior to broadcast.

\* \* \* \* \*